United States Patent Office 3,386,932
Patented June 4, 1968

3,386,932
NOVEL CELLULOSICS, SEGMENTED CO-
POLYMERS, AND METHODS OF PRE-
PARING SAME
Henry W. Steinmann, Sparta, N.J., assignor to Celanese
Corporation, a corporation of Delaware
No Drawing. Continuation-in-part of application Ser. No.
379,386, June 30, 1964. This application Dec. 22, 1965,
Ser. No. 515,713
23 Claims. (Cl. 260—16)

This application is a continuation-in-part-of Ser. No. 379,386, filed June 30, 1964, now abandoned.

This invention relates to a process for depolymerizing high molecular weight polyanhydroglucose esters, and more particularly to a process for depolymerizing high molecular weight polyanhydroglucose triesters, especially cellulose triacetate. This invention also relates to a process for producing copolymers containing such depolymerized esters, or modified reaction products thereof. More particularly, this invention relates to a process for producing block copolymers and to block copolymers prepared thereby containing low molecular weight, e.g. cellulose triacetate blocks as a constituent of the copolymers.

Block copolymers, which are well-known in the art, have heretofore been synthesized by linking "soft" polymer blocks, that is, low melting polymers having relatively weak interchain attractive forces, such as, for example, polyesters and polyethers, with "hard" polymer blocks, such as, for example, polyurethanes and polyamides. Although a number of different block copolymers have been synthesized, the utility of such copolymers has been restricted by the limited type of block copolymers that have heretofore been prepared.

It is an object of my invention to provide a method for depolymerizing high molecular weight polyanhydroglucose esters into segments suitable for preparing a variety of copolymers, and particularly, block copolymers. A further object of my invention is to prepare block copolymers by combining low molecular weight, e.g. cellulose triacetate blocks with low molecular weight polyester or polyether blocks. An even further object is to modify the low molecular weight cellulose ester blocks to provide novel reactants for the preparation of block copolymers. A still further object of my invention is to prepare block copolymers suitable for casting into films having desirable properties of clarity, flexibility, and toughness. Other objects and advantages of my invention will be apparent from the following detailed description and claims.

It should be noted that, although reference is made herein primarily to cellulose triacetate, my invention is also applicable to the esters, especially the triesters, e.g. the triacetates of other carbohydrates, such as, for example, starch and glycogen, and is similarly applicable to the esters derived from carboxylic acids having from 1 to 4 carbon atoms. However, for simplicity and ease of description and specification refers hereinafter to cellulose triacetate as a representative embodiment. Moreover, the triesters (and especially cellulose triacetate) are preferred for the properties and linearity of the resulting copolymers.

In the specification and claims the term "cellulose triacetate" has reference to cellulose wherein substantially all of the hydroxyl groups of the cellulose have been esterified. The degree of esterification can be expressed in terms of an acetyl value calculated as combined acetic acid by weight with the theoretical maximum of pure cellulose triacetate having a value of 62.5%. A fully esterified cellulose derivative is preferred when the objective is to prepare a bifunctional block copolymer substantially free of cross-linking, i.e. interchain linkages. However, in the case where strict linearity is not necessary or a functionality greater than 2 preferred, it is not necessary to start with a fully esterified cellulose. Generally, the cellulose acetates have acetyl values of between about 55 and 62.5, preferably at least 59 percent.

In accordance with this invention a high molecular weight cellulose triacetate is depolymerized while maintaining the acetyl groups thereof substantially intact by contacting the high molecular weight cellulose triacetate under controlled conditions with an acid catalyst in a solvent. The low molecular weight cellulose triacetate to be produced is subsequently recovered and reacted with a soft polymer, such as a low molecular weight polyester or a low molecular weight polyether, to yield a block copolymer containing low molecular weight cellulose triacetate blocks coupled to a polyester or polyether. Generally, a coupling agent, such as an organic diisocyanate is employed. The cellulose blocks, where suitably terminated, e.g. with carboxyl groups, may be reacted directly with other polymers, e.g. amide blocks having terminal amino groups such as low molecular weight nylon 6, or may be further treated (with e.g. a diamine such as hexamethylene diamine) to form a polymerizable moiety (in this case, an amine salt, yielding amide linkages upon condensation).

Methods of producing a comparatively high molecular weight cellulose triacetate are well-known in the art. However, heretofore the depolymerization of cellulose triacetate to low molecular weight cellulose triacetate having bifunctional end groups for block polymer preparation and prepared by chemical means has not been reported.

It had previously been suggested to degrade cellulose triacetate by mechanical means, X-rays, heat and chemical processes. The chemical processes that had been proposed had generally been in the nature of hydrolytic degradation, i.e. acetolysis, alcoholysis or hydrolysis effected in systems containing acetic acid and/or water with or without a sulfuric acid catalyst, and aryl sulfonic acids and hydrobromic acid in various solutions. However, when such chemical processes were attempted the results were not always satisfactory as was evidenced, for example, by the considerable deacetylation which accompanied the degradation by means of aryl sulfonic acids. In the acetic acid and water systems it had previously been found that the attempted degradation of cellulose acetate resulted in deacetylation with but a small amount of depolymerization.

Thus, in one aspect of my invention cellulose triacetate is depolymerized to lower molecular weight materials while the acetyl groups are maintained substantially intact, i.e. depolymerization is accompaned by very little or no loss of acetyl groups. As a result of the degradation process of my invention, low molecular weight cellulose triacetate fragments are produced which are soluble in common solvents and which possess functional ends on the degraded fragments. In addition, these low molecular weight fragments lend themselves to the ready preparation of block copolymers.

In accordance with this aspect of my invention, I have found that high molecular weight polymeric cellulose triacetate can be deploymerized while maintaining the acetyl groups substantially intact by contacting the high molecular weight cellulose triacetate under controlled conditions in the presence of a solvent with an acid catalyst, thereby producing a low molecular weight cellulose triacetate.

In practice of my invention, it is preferable to employ as the starting material a fully acetylated high molecular weight cellulose triacetate, i.e. one having an acetyl value (A.V.) of 62.5% acetic acid. It will be understood, of course, that depolymerization can be carried out according to my invention employing as the starting material high molecular weight cellulose esters which are not fully acetylated, but which exhibit acetyl values of at least 55, and most preferably at least 59%. For example, commercial grade high molecular weight cellulose triacetate having an A.V. of about 61.5% can be smoothly depolymerized in accordance with my invention.

It is also preferable that the initial inherent viscosity of the cellulose triacetate starting material be as high as possible consistent with the desirability of producing substantially clear solutions in chlorinated hydrocarbon solvents. The depolymerization process of this aspect of my invention, however, is suitable for depolymerizing high molecular weight cellulose triacetate having a wide range of inherent viscosities. Preferably, the cellulose triacetate starting material should have an inherent viscosity (I.V.) in the range of about 1.5 to about 2.0 deciliters per gram, although my process is applicable to cellulose triacetate having inherent viscosities outside of the preferred range.

The term inherent viscosity (I.V.) as used throughout the specification and claims is defined as $$I.V. = \frac{\ln R}{C}$$

wherein R is the viscosity of a solution of 0.5 gram of cellulose triacetate in 100 milliliters of a 9/1 mixture of methylene chloride-methanol solvent at 30° C. divided by the viscosity of the solvent in the same units as the solution and at the same temperature, and wherein C is the concentration of cellulose triacetate solution in grams of cellulose triacetate per 100 milliliters of solution.

In the particular aspect of depolymerizing the high molecular weight celluose triacetate to low molecular weight cellulose triacetate, several different solvent and catalyst systems can be employed. Preferably an organic solvent and an acidic catalyst are employed as the depolymerization system. One such catalyst-solvent system comprises the utilization of a Friedel-Crafts metal halide such as a boron halide, preferably anhydrous boron trifluoride or its complexes (a Lewis acid), as the catalyst and chlorinated hydrocarbon as the solvent. Another preferred catalyst-solvent system which can be employed as is a blend of acetic acid and water in particular proportions as the solvent and sulfuric acid as the catalyst. Perchloric acid can also be used as the catalyst in the systems described.

When conducting the depolymerization of high molecular weight cellulose triacetate employing the boron trifluoride-chlorinated hydrocarbon system it is preferred that the system contain little or no water or hydroxylated compounds such as glycols. The presence of substantial amounts of water of glycols not only dilutes the effectiveness of the catalyst but also enhances the loss of acetyl groups through hydrolysis or ester interchange, which is undesirable. Thus, it is desirable to employ anhydrous boron trifluoride as the catalyst, or boron trifluoride complexed with small amounts of water or glycols. In the case where a complex of boron trifluoride and water or a complex of boron trifluoride and glycol is employed, it is preferred that the molar ratio of boron trifluoride to water or glycol be about 1 or greater. When anhydrous boron trifluoride is employed, it is preferred to add a molar equivalent of water or glycol after the depolymerization process. The system can be conveniently dried by azeotropic distillation of the water-chlorinated hydrocarbon mixture prior to the addition of the catalyst.

The concentration of the solution of high molecular weight cellulose triacetate in the chlorinated hydrocarbon solvent can vary over an extremely wide range provided that the concentration of the cellulose triacetate for a given volume of solvent is sufficiently low that the solution is substantially free from insoluble particles. It is also desirable that the viscosity of the solution not be so high that it can not be agitated by standard equipment. Preferably, the cellulose triacetate constitutes from about 10 to about 15% by weight of the solution.

The amount of the boron trifluoride catalyst employed in this system can also vary over a wide range dependent upon the particular temperature employed for the depolymerization. Suitable temperatures are, for example, within the range of 0° to 150° C. When employing lower temperatures, such as room temperature and below, it is desirable to use a high catalyst level, such as, for example, about 10% by weight based on the high molecular weight cellulose triacetate present. When employing high temperatures, such as, for example, about 75° C., it is desirable to use a lower catalyst level such as, for example, about 0.1 to 2% by weight based on the amount of high molecular weight cellulose triacetate present. Preferably, the depolymerization in this system is carried out at a temperature in the range of from about 70° to 80° C., employing a catalyst level of from about 0.5 to about 2% by weight based on the high molecular weight cellulose triacetate. Higher temperatures and autogenous pressures greater than atmospheric pressures with a low catalyst level can also be employed with this system.

The Friedel-Crafts catalyst, preferably anhydrous boron trifluoride, can be in the form of boron trifluoride gas or a solution of boron trifluoride complexed with water or organic compounds having oxygen or sulfur or the donor atom. The coordinate complex of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether, is the preferred coordinate complex. Other specific boron fluoride complexes, for example, are the complexes with ethanol, methanol, propanol, butanol, phenol, methyl acetate, ethyl acetate, phenyl acetate, acetic acid, benzoic acid, acetic anhydride, acetone, methyl ethyl ketone, dimethyl ether, methyl phenyl ether, acetaldehyde, chloral, dimethyl sulfide, and ethyl mercaptan. Other Friedel-Crafts compounds include antimony trifluoride, phosphorous pentachloride, phosphorous pentafluoride, titanium tetrachloride, ferric chloride, stannic chloride, stannous chloride, etc.

When using a boron trifluoride-water complex or boron trifluoride-glycol complex as catalyst, the addition of dioxane to the solution aids in solubilizing the catalyst. The addition of other polyoxyalkylenes, such as dioxolane and trioxane, will also aid in solubilizing anhydrous boron trifluoride catalyst.

When working with the boron trifluoride-chlorinated hydrocarbon system, I have found that the higher the temperature and/or catalyst level, the greater is the tendency for the solution to discolor during depolymerization. I have further discovered, however, that the addition of certain of the solubilizing agents mentioned above, e.g. trioxane and dioxolane, reduces such solution discoloration significantly. Thus, for example, a 10% high molecular weight cellulose triacetate solution in ethylene chloride containing 1½% boron trifluoride catalyst based on the weight of the cellulose triacetate will turn brown in a few minutes at a temperature of 75° C. If the solution contains one part by weight of dioxolane for every part of high molecular weight cellulose triacetate at the same concentration, catalyst level and temperature, however, the solution will remain pale yellow and clear for several hours. When one part of trioxane is used for every part of high molecular weight cellulose triacetate, a precipitation of polyoxymethylene accompanies the depolymerization. After filtration and catalyst neutralization, however, there results an almost colorless thin solution of low molecular weight cellulose triacetate. With lower concentrations of trioxane, such as, for example, 0.1 part by weight for each part of high molecular weight cellulose triacetate, there is no precipitation of polyoxymethylene from the solution at 75° C. or at room temperature.

The depolymerization in the boron trifluoride-chlorinated hydrocarbon system should be carried out in the absence of substantial amounts of hydroxyl compounds which tend to lower the rate of reaction significantly, such as, for example, water, alcohols, glycols and hydroxy acids. Moreover, the presence of these hydroxyl containing compounds in substantial amounts tends to hydrolyze and transesterify the cellulose triacetate.

It should be noted, however, that it is desirable to add hydroxyl-containing compounds in small percentages during the depolymerization, e.g. in the form of catalytic complexes; or to add active hydrogen, e.g. hydroxyl-containing compounds, such as water, glycols and the like during or after the depolymerization has been completed in order to produce functional end groups (e.g. hydroxyl) on the depolymerized cellulose triacetate fragments.

Any of a wide variety of such terminating agents having active hydrogen containing substituents may be employed to modify the cellulose terminal groups. For example, novel cellulose triacetate blocks with mercapto, hydroxy, or carboxy substituents may be prepared by adding to the reaction system, preferably comprising a non-oxidizing catalyst (e.g. a boron halide-chlorohydrocarbon system), a selected mercaptan, hydroxyaryl compound, or dibasic acid/acid anhydride mixture, respectively. Generally speaking, any bifunctional compound having active hydrogen substituents, e.g. hydroxy, carboxy, amino, amido, mercapto, etc., may be employed in this manner, but those of little tendency to hydrolytically remove the ester substituents or transesterify the cellulosic are preferred. The mercaptans, hydroxy aromatics, and organic acid/anhydride systems have been found most useful.

The proportion of terminating agent/cellulosic may range from 0.001:1 to 2:1, preferably no more than 1:1. It may be added at any point in the process, e.g. as part of the catalyst feed, as a direct additive during the polymerization process, or as a subsequent reactant. Those agents which tend to hydrolytically remove the desired ester substituents or transesterify the cellulosic, e.g. water, glycols and the like are preferably added in lower proportions, e.g. 1% based on the weight of cellulose triacetate, subsequent to the depolymerization. Thus, for ease of operation, especially in a continuous process, terminating agents such as hydrogen sulfide or the hydroxyaryls are preferred since they may be added directly to a continuous feed stream and permit the substantial retention of the ester substituents.

The mercaptans (or organic thiols) include hydrogen sulfide and its analogs having one or more —SH groups directly bonded to a carbon atom which forms part of the organic moiety, which in turn may be aliphatic or aromatic, cyclic, bicyclic or fused cyclic, saturated or unsaturated, but preferably is an aliphatic hydrocarbon chain having 1 to 18 carbon atoms.

The suitable organic thiols include methyl mercaptan (methanethiol), ethyl mercaptan, butyl mercaptan, propyl mercaptan, chloromethyl mercaptan, phenyl mercaptan, vinyl mercaptan, allyl mercaptan, benzyl mercaptan, cyclohexyl mercaptan, p-tolyl mercaptan, cyclopentyl mercaptan, 1,2-ethane dithiol, 1,4-butane dithiol, 1,3,3-pentane trithiol, 2-methoxy-5 octane thiol, 2,2-dichloro-4-butane thiol, 1,4-benzene dithiol, 2,2-dimethyl-4-butanethiol, 2-methoxy-5-pentanethio, α-cyano δ-octanethiol, 1,3-dinitro 5-benzenethiol, 1,3-dihydroxy 5-benzenethiol, etc.

The liquid alkyl mercaptans having 1 to 10 carbon atoms in a straight chain hydrocarbon structure are the preferred members of the organic group, whereas hydrogen sulfide constitutes the most preferred embodiment.

Most preferably, hydrogen sulfide is added as part of a boron trifluoride catalyst stream in proportions of 0.01:1 to 10:1 with respect to $BF_3$, and amounts of 0.1 to 100% based on the depolymerized cellulose acetate. The preferred reaction system comprises a chlorohydrocarbon such as ethylene chloride, containing about 10 weight percent of the cellulosic. The percentage of free hydrogen sulfide appears to be best maintained by bubbling the gas through the catalyst solution, or the reaction mixture. Elevated temperatures of 65–75° C. are preferred although lower temperatures, e.g. room temperature may be employed at higher catalyst levels.

Snow white products are obtained in accordance with this aspect of the invention. The sulfur content depends upon the extent of depolymerization—generally, it is in the range of 0.5 to 1.5% as determined by elemental analysis. The infrared spectrum shows a major hydroxyl absorption at 3482 cm.$^{-1}$ believed due to secondary hydroxyl groups and a 3.9 micron absorption due to mercaptan groups. The mercaptan group is readily oxidized to the disulfide group with iodine or hydrogen peroxide and the disulfide group reduced back to the mercaptan with zinc and acetic acid.

While the mercaptans are often monofunctional, i.e. contain a single group having an active hydrogen atom, the polfunctional active hydrogen compounds and especially bifunctional reactants are often employed, especially the polyhydroxy compounds such as the glycols, the bifunctional mercaptans, the mixed glycol-mercaptan molecules like $HOCH_2CH_2SH$, the polyhydroxy aryls, etc.

The glycols are generally represented by the monomeric aliphatic members, such as ethylene glycol, pentamethylene glycol, isobutylene glycol, etc. but it should be understood that low polymeric glycols, such as those generally described below as suitable polyether segments for block copolymer, may also be employed where desirable.

The aromatic compounds may comprise one or more aromatic rings, fused or connected by aliphatic links, containing at least one and generally two substituents having active hydrogen atoms, such as one or more of carboxy, hydroxy, amino, amido, etc. groups as represented by the following hydroxy substituted compounds: phenol, pyrogallol (2,3-dihydroxyphenol), phloroglucinol (3,4-dihydroxyphenol), hydroquinone (4-hydroxyphenol, catechol (2-hydroxyphenol) resorcinol (3-hydroxyphenol), 3,4-dihydroxyphenol, bisphenol-A (propylidene bis-p-phenol), 4,4'-bis(hydroxymethyl) biphenyl, 1,4-bis(hydroxymethyl) benzene, and 1,4-bis(hydroxymethyl) durene. The amido and carboxy substituted compounds such as 4,4'-bis(acetamido) biphenyl, p-carboxy phenol, p-carboxy aniline, etc. may be readily selected by analogy.

A particular preferred embodiment employs a hydroxyaryl such as phenol, bisphenol-A or hydroquinone in reactant proportions of hydroxyaryl/cellulosic of 0.1:1 up to 1:1 (preferably 0.1:1 up to 0.4:1 with hydroquinone, or 0.2:1 up to 0.81:1 with bisphenol-A). Generally, a 10 weight percent anhydrous solution of cellulose triacetate in a chlorohydrocarbon solvent, containing the hydroxyaryl compound, is subjected to elevated temperatures of 70–80° C. in the presence of a boron fluoride catalyst for 2–6 hours.

The products, containing hydroxyaryl and hydroxyl terminal groups believed to be in the 1 and 4 positions (with a 1–2% free hydroxyl content), are generally soluble in methylene chloride and insoluble in acetone. Rast molecular weights are in the range of 1000–4000 and inherent viscosities are about 0.01–0.30 deciliters/gm. (in a 0.5 weight percent solution of polymer in a 9/1 mixture of methylene chloride/methanol) at 30° C.

Further modification, to provide primary hydroxyl groups, may be effected by reaction with an epoxide (e.g. an alkylene oxide such as ethylene oxide) in the same reaction mixture in the presence of active boron fluoride catalyst at temperatures of 20–70° C. The diepoxides are also suitable, such as the diglycidyl ethers of bisphenol-A.

A still further suitable terminating agent comprises a mixture of a dibasic acid and its anhydride. Representative acid/anhydride systems include the maleic, succinic, n-dodecenyl, phthalic, hexahydrophthalic, itaconic, methyl succinic, tetrapropenyl succinic, methyl nadic, glutaric and adipic acids and their anhydrides. Also suitable are the polyanhydrides such as the polysebacic, polymalonic, polyadipic, polyterephthalic and polyisophthalic anhydrides such as those prepared from tetracarboxylic acids, e.g. pyromellitic anhydride, cyclopentane dianhydride, and the dianhydride of 3,4,3',4'-tetracarboxylic acid of benzophenone. Any proportion of anhydride to free acid appears suitable; some free acid form is always expected to be in the system provided, for example, by the reactants.

While any of strong acid catalysts such as sulfuric acid or p-toluene sulfonic acid may be employed, a perchloric acid process is preferred for its rapidity. The chlorohydrocarbons (e.g. ethylene chloride or sym tetrachloroethane) are preferred, alone or in combination with a co-solvent solubilizing aid such as dioxane. Suitable times and temperatures will be selected interdependently, with representative processes employing a sulfuric acid catalyst in a 5 minute treatment at 120° C., or a 24 hour treatment at room temperature.

The mechanism of the reaction is not entirely understood, but it appears that as cellulose triacetate chains are cleaved the ends esterify, giving fragments having carboxyl end groups bonded to the cyclic anhydroglucose moiety at the 1 and 4 positions as

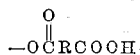

groups, wherein R is a divalent organic radical derived from the dibasic acid/anhydride. Depolymerization of cellulose triacetate with dianhydrides probably yields both carboxyl and carboxylic anhydride end groups.

The cellulose blocks thus obtained may be readily converted into block polymers by reaction with low molecular weight polyesters or polyethers in the presence of an organic diisocyanate, or by conversion of the carboxy groups to acid chloride or mixed anhydride groups and subsequent reaction thereof with organic diamines or diols.

Thus, novel low molecular weight cellulose triacetate reactants may be provided, having the general characteristics of the depolymerized triacetate prepared according to the principal process of this invention, but also possessing modified functionality in the terminal positions providing greater flexibility in the preparaton of block copolymeric products.

The depolymerization of the high molecular weight cellulose triacetate in accordance with this aspect of my invention is evidenced by the decrease in viscosity of the reaction solution at a given temperature thus providing a means for indicating the initiation and completion of the depolymerization, as well as the rate at which the depolymerization is proceeding. The rate of viscosity decrease in any particular depolymerization is dependent upon the particular conditions employed. Thus, a high catalyst level and/or a high temperature accelerate the rate of depolymerization and consequently the rate of viscosity decrease is proportionately accelerated.

The length of time required for depolymerization when employing this system of my invention also depends upon the depolymerization conditions and the extent of depolymerization required. The time required can vary from a few minutes at an elevated temperature, such as, for example, about 75° C., up to several days at room temperature or lower temperatures. It will readily be understood, therefore, that any of the conditions contributing to rapid depolymerization, such as anhydrous conditions, high catalyst level and/or high temperature, increase the rate of depolymerization and thus decrease the time required for depolymerization.

After depolymerization has been completed or has proceeded to the desired extent, the boron trifluoride catalyst can be neutralized by the addition to the solution of organic amines or inorganic basic compounds. Suitable neutralizing reagents for employment with the boron trifluoride system include, for example, triethylamine, tributylamine, pyridine, and aqueous solutions of sodium bicarbonate and sodium acetate.

The depolymerized cellulose triacetate intermediate can be separated from the solution by evaporating the solvent at room temperature under atmospheric pressure or under vacuum or by precipitating the product out of solution.

After solvent removal, there remains a slightly colored granular or film-like solid. The residual color of the depolymerized cellulose triacetate can be readily extracted by soaking the product in alcohol or an alcohol-acetone mixture followed by digesting with water in the steam bath after which the triacetate is collected and vacuum dried. The final depolymerized cellulose triacetate, after color removal, is generally a white, opaque or translucent granular solid and is obtained in yields ranging from about 90 to about 98% based on the weight of the original cellulose triacetate.

This low molecular weight cellulose triacetate is soluble in methylene chloride, methylene chloride-methanol mixtures, dimethyl formamide, dimethyl sulfoxide and the like. When the depolymerization is carried sufficiently far, the depolymerized cellulose triacetate also becomes soluble in acetone. Those depolymerization products which are acetone soluble are also usually soluble in hot dioxane and methyl ethyl ketone.

The depolymerized cellulose triacetate products obtained from practicing this aspect of my invention have melting points below that of the original cellulose triacetate starting material. The greater the extent of depolymerization the lower is the melting point of the cellulose triacetate segment. Generally, the melting points of the segments lie in the range of about 240° C. to about 295° C. and in some instances may even have lower melting points. Those cellulose triacetate segments obtained from depolymerization carried out in the presence of trioxane or dioxolane have been found to melt with considerably less discoloration than the original triacetate. It should be noted that throughout the specification and claims the melting points which are mentioned were determined on a melting point block in which the sample was subjected to light pressure using a spatula. During the melting point determination the sample was maintained between glass plates.

The inherent viscosity of the low molecular weight cellulose triacetate, measured in the manner indicated above, can vary over a wide range. Usually the I.V. is within the range of about 0.05 dl./g. to about 0.40 dl./g., although triacetate having both a higher and a lower I.V. can be obtained depending upon the depolymerization conditions employed and the extent of depolymerization effected.

The acetyl value of the cellulose triacetate segments obtained from the depolymerization step of my process depends both upon the extent of the depolymerization and the particular reagents present during the depolymerization. Thus, for example, in the absence of trioxane or dioxolane during the degradation of 62.5% A.V. cellulose triacetate starting material, the A.V. of the segments have been found to be generally in the range of about 60 to about 62.5%. On the other hand, however, in the depolymerization of the same starting material cellulose triacetate in the presence of trioxane or dioxolane the A.V. of the segment is lower and is related to the percentage of oxymethylene that actually combines with the depolymerized cellulose triacetate. In the case of depolymerizations conducted in the presence of dioxolane, the percent of oxymethylene introduced into the cellulose triacetate segment usually varies from about 0.1 to 1.5% by weight as based on the weight of the depolymerized cellulose triacetate and the A.V. usually lies between about 59 and 62%. In the case of depolymerization conducted in the presence of trioxane, the percentage of oxymethylene introduced into the segment usually varies from about 0.1 to about 10% and the A.V. usually lies between about 56 and about 62%.

The hydroxyl content of the depolymerized cellulose triacetate segments, as determined by acetylation in pyridine at elevated temperature, is usually in the range of from about 0.1 to about 1.0% depending upon the extent of depolymerization. The lower the I.V. or the molecular weight of the segments, the higher is the hydroxyl content and vice versa. I have found that depolymerization carried out in the presence of trioxane tend to give lower hydroxyl values as compared to depolymerizations carried out in the presence of dioxolane.

Infra-red examination of the depolymerized low molecular weight cellulose triacetate obtained from the boron trifluoride-chlorinated hydrocarbon system shows the presence of secondary hydroxyl groups of cellulose. It is believed that the occurrence of the hydroxyl groups in the depolymerized triacetate results from the cleavage of the acetal groups (linking the acetylated anhydroglucose units in the cellulose triacetate) during depolymerization and reaction of the cleaved ends.

X-ray examination of the depolymerized segments show that they are crystalline and exhibit the crystal structure of cellulose triacetate II.

When conducting the depolymerization of high molecular weight cellulose triacetate employing the acetic acid-water system, I have found that the depolymerization can be effected without the usual undesirable high degree of deacetylation by maintaining a low water content in the acetic acid.

As mentioned above, the reaction behavior of cellulose triacetate in acetic acid or acetic acid-water solutions in the presence of strong acids has been extensively reported in the literature, particularly the kinetic data on rates of degradation. For example, depolymerization in anhydrous acetic acid will proceed with some acetylation of the cleaved fragment ends and since water is absent, no hydrolysis of the acetate groups will take place. On the other hand, when water is present in the system the rate of depolymerization is somewhat lower and the presence of water enhances the hydrolysis of the acetate groups.

I have discovered that the amount or proportion of water in the depolymerization solution is important in producing a low molecular weight cellulose triacetate for use in preparing block copolymers which are soluble in common organic solvents such as methylene chloride. The essence of this aspect of my invention is the finding that if the water content of the acetic acid solution is carefully controlled within a particular narrow range, a substantially bifunctional low molecular weight cellulose triacetate suitable for preparing soluble block copolymers can be obtained. It is believed that if a small percentage of water is present in the acetic acid solution, depolymerization will proceed with minimum hydrolysis of the acetate groups, and further, since water is considerably more basic than acetic acid, it is also believed that as the cellulose triacetate chains cleave hydroxyl groups are preferentially formed on the fragment ends.

It should be noted that if no water is present, at least one fragment end will be acetylated and under such conditions the cellulose triacetate segments will be less than bi-functional. If these segments are used for the preparation of block copolymers it is found that the functionality is inadequate to give high molecular weight copolymers. On the other hand, if too much water is present in the system during depolymerization, acetyl groups will be more readily hydrolyzed resulting in products having a hydroxyl functionality significantly greater than 2. This latter condition leads to cross-linking and the formation of insoluble polymers when the hydrolyzed products are used for the preparation of block copolymers. It can be stated, then, that of all the reaction conditions of this aspect of my invention the proportion of water in the acetic acid depolymerization solution is the most critical.

In accordance with this aspect of my invention, the water content of the acetic acid depolymerization solution will vary with the catalyst employed therein. When sulfuric acid is employed as the catalyst, the water content may range from about 0.5 to about 1.5% water by weight, with optimum results being achieved using a water content of from 0.8 to 1.2%. When perchloric acid is employed as the catalyst, the amount of water utilized may vary from about 0.5 to about 1.2% by weight, with the preferred range being from 0.6 to 1.0%. The water employed in the depolymerization solution can be added all at once at the start of the depolymerization or it can be added incrementally during the depolymerization.

The catalyst level employed in this aspect of my invention is dependent upon both the type of catalyst and the temperature employed for a particular depolymerization. Thus, for example, when employing sulfuric acid as the catalyst an amount in the range from about 1 to about 20% by weight based on the high molecular weight cellulose triacetate, and preferably from about 5 to 10% by weight, can be employed with a depolymerization temperature in the range from about 50° to 110° C. and preferably from about 80° to about 100° C. When using perchloric acid as the catalyst, an amount in the range from about 0.5 to about 5.0% by weight based on the high molecular weight cellulose triacetate, and preferably from about 1 to 2% by weight, can be employed with a depolymerization temperature from about 50° to 80° C., and preferably from about 70° to about 80° C. In general, depolymerization carried out at the higher temperature level require the lower catalyst level and those carried out at the lower temperature level require the higher catalyst level. The actual time of depolymerization depends upon the temperature, the catalyst employed, the catalyst level and the extent of depolymerization desired. The employment of a high catalyst level, a high temperature and an extended time leads to the formation of lower molecular weight depolymerized triacetates. Particularly desirable results are attained, for example, by employing a temperature of 100° C. for from 1 hour to 1.5 hours in a system using a sulfuric acid catalyst and a water content of about 1%.

The concentration of the high molecular weight cellulose triacetate in the acetic acid solution can be varied over a wide range. It is highly advantageous, however, that a relatively good solution be obtained which is substantially free of gel particles. I have found that operating at a temperature of about 80° C. not only provides the advantage of shorter reaction time, but also provides better solution properties. Generally, I find that a cellulose triacetate concentration of about 10% by weight is preferred.

After the depolymerization step has been completed, the catalyst can be neutralized with any of a variety of organic and inorganic basic compounds such as sodium acetate, sodium bicarbonate, magnesium acetate, pyridine and the like.

Precipitation of the depolymerized cellulose triacetate intermediate can be effected by pouring the thin dope reaction mixture into water or into a non-aqueous solvent such as, for example, petroleum ether. The selection of water or the non-aqueous solvent depends largely on the extent to which the depolymerization has been carried. Thus, when the depolymerization has been mild to obtain comparatively high molecular weight blocks, precipitation in water is preferred since a fibrous precipitate is obtained which is easily washed. If depolymerization is continued to obtain comparatively low molecular weight blocks, however, precipitation in water yields a fine particle precipitate which is sparingly soluble in dilute acetic acid. This solubility results in lower yields and also causes difficulty in washing. In such cases it has been found that precipitation in petroleum ether is desirable. The low molecular weight intermediates precipitate in petroluem ether as a stick solid or even an oil. After setting for a few minutes, the petroleum ether containing most of the acetic acid is decanted and the acetic acid and petroleum ether can thereafter be recovered by distillation. The sticky solid or oily residue can then be dried under mild conditions to remove residual acetic acid, thereby yielding a harder intermediate which is more readily handled during subsequent operations, such as, for example, washing with water.

These low molecular weight cellulose triacetate intermediates are white and may be powdery, granular or fibrous depending upon the degree of depolymerization. They are also soluble in methylene chloride and other typical solvents for cellulose triacetate. The intermediates vary in melting point depending upon the degree of depolymerization with the melting point decreasing as the extent of depolymerization increases. The A.V. and hydroxyl content also depend upon the extent of depolymerization as well as upon the percentage of water employed in the depolymerization system. The higher the water content of the depolymerization solution and the greater the extent of depolymerization, the higher is the hydroxyl content and the lower the A.V. For optimum utilization of these low molecular weight cellulose triacetate blocks in the copolymer formation step of my process, the depolymerization conditions should be such that the hydroxyl content, the A.V. and the molecular weight of the depolymerized product correspond as closely as possible to the theoretical value calculated by assuming no loss of acetyl groups and hydroxylation of the fragment ends as the main chains cleave.

The low molecular weight cellulose triacetate obtained from either the boron trifluoride-chlorinated hydrocarbon system or the acetic acid and water system can generally be described as having an average molecular weight of about 1,000 to about 5,000 as determined by the Rast method and an I.V. generally in the range of 0.05 to 0.4 dl./g. The process of my invention, however, is not limited to the employment of low molecular weight cellulose triacetate having properties within the abovementioned ranges but is also operable employing low molecular weight cellulose triacetate having molecular weights both smaller and larger than those mentioned above and having an I.V. also larger and smaller than those mentioned above.

The low molecular weight cellulose triacetate employed in the polymerization step of my invention contains functional terminal groups, preferably hydroxyl groups, which are formed in the depolymerization steps previously disclosed. In the boron trifluoride-chlorinated hydrocarbon system wherein the depolymerization is carried out using a boron trifluoride-water complex or a borontrifluoride-glycol complex, it is believed that the hydroxyl groups that form are end groups resulting from the cleavage of the cellulose triacetate chains. As was also mentioned in relation to using anhydrous boron trifluoride, the addition of a hydroxyl containing compound in the reaction mixture subsequent to the depolymerization also assists in the formation of terminal functional groups. In the acetic acid-water system it is the presence of the extremely small proportion of water which permits the formation of terminal functional hydroxyl groups yielding the substantially bi-functional depolymerized cellulose triacetate. These terminal functional groups can then serve as reaction sites for the preparation of a variety of copolymers, such as, for example, block copolymers, by reaction with organic diisocyanates to form urethane links. Furthermore, the low molecular weight cellulose triacetate obtained from the depolymerization step is substantially a triacetate, i.e., the depolymerization occurred under conditions that substantially maintained the original acetate groups intact.

In accordance with this aspect of my invention, I have found that a variety of copolymers can advantageously be prepared from a system consisting of low molecular weight cellulose triacetate and a polymer possessing terminal functional groups, i.e., groups having active hydrogen. Of especial interest is my discovery that, by selecting the proper components for my copolymers, I obtain block copolymers which are soluble in organic solvents and which can be readily converted to films having desirable physical properties of clarity, flexibility and toughness.

Particularly useful copolymers prepared by the method of my invention are formulations based on the reaction of diisocyanates with the terminal groups of polyesters or polyethers or similar polymers possessing suitable terminal functional groups and with the terminal active hydrogen containing, e.g. mercapto, or hydroxyl groups of depolymerized, low molecular weight cellulose triacetate to thereby form an essentially linear copolymer. It should be noted that, although reference is made herein primarily to copolymers comprising low molecular weight cellulose triacetate linked by means of isocycanate groups to polymers having terminal functional groups, my invention is also applicable to copolymers of low molecular weight cellulose triacetate wherein linking agents other than isocyanates are utilized. Examples of these are phosgene to form carbonate linkages, biscarbamyl chlorides to form urethane linkages, diacid chloride or dianhydrides such as isophthalyl chloride and pyromellitic anhydride to form ester linkages, and difunctional silanes such as dichlorodimethyl silane to form ether linkages. Moreover, it will be apparent that as the end group of the cellulosic component is altered, to e.g. terminal carboxyl, different polymeric structures may be formed, e.g. polyamides by reaction of the cellulosic block with a diamine such as hexamethylene diamine, to form an amine salt, and subsequent condensation. As was mentioned previously, copolymers of especial interest are prepared from low molecular weight cellulose triacetate, polyesters or polyethers.

Illustrative examples of polyhydroxyl compounds which may be used to prepare the polyester or polyether segments of my copolymers include: ethylene glycol, diethylene glycol, triethylene glycol, pentamethylene glycol, hexamethylene glycol, decamethylene glycol, dodecamethylene glycol, propylene glycol, 1,2-propylene glycol, 1,3-propylene glycol, butanediol-1,2, butanediol-2,3, butanediol-1,3, butanediol-1,4, isobutylene glycol, pinacol, hexanediol-1,4, pentanediol-1,5, 2-methyl-2-4-pentanediol, heptanediol-1,7, heptanediol-1,4, thiodiglycol, n-butyldiethanolamine, N-N-diethanolaniline, hydroquinonediglycol ether, transhexahydroxylene glycol, m-dihydroxybenzene, and o-dihydroxybenzene.

Representative of the dicarboxylic acids which may be employed with dihydroxy compounds to prepare the polyester segments of my copolymers include: adipic, beta-methyl adipic, azelaic, fumaric, glutaric, 2-phenylglutaric, malic, maleic, malonic, sebacic, suberic, succinic, pimelic, 4-ketopimelic, itaconic, dehydromuconic, decane-1,10-dicarboxylic, ketoundecanedioic, acetylenedicarboxylic, acetone dicarboxylic, diphenic, p-phenylenediacetic, phthalic, isophthalic, terephthalic, hexahydroterephthalic, cyclopentane-1,2-dicarboxylic, cyclopentane-1,3-dicarboxylic, cyclohexene-1,2-dicarboxylic, cyclohexane-1,3-dicarboxylic, cyclohexane-1,4-dicarboxylic, naphthalene-1,2-dicarboxylic, naphthalene-1,3-dicarboxylic, naphthalene-1,4-dicarboxylic, naphthalene-1,5-dicarboxylic, diphenylene-2,2-dicarboxylic, diphenylene-4,4'-dicarboxylic, diphenylene-2,4'-dicarboxylic, xylylene-1,4-dicarboxylic, xylylene 1,3-dicarboxylic, xylylene-1,2-dicarboxylic and camphoric.

The method selected to prepare the polyesters or polyethers is not critical to this invention and it is contemplated that any of the synthetic methods well-known in the art may be employed to obtain these polymers.

Suitable polyethers or polyesters which may be prepared from the polyhydroxyl and polycarboxyl compounds listed previously include, for example poly (ethylene glycol); poly (tetramethylene oxide); polyethylene ether glycol, and the reaction products of: ethylene glycol and adipic acid; diethylene glycol and adipic acid; propanediol and sebacic acid; ethylene glycol, propylene glycol, and adipic acid; adipic acid, phthalic acid and hexanetriol; 2,2-dimethyl-1,2-propanediol and sebacyl chloride; 2,2-dimethyl-1,3-propanediol and dimethyl sebacate.

A variety of organic diisocyanates may be used in the process of the present invention. Illustrative examples of these polyisocyanates are: trimethylene diisocyanate, tetramethylene diisocyanate, pentamethylene diisocyanate, hexamethylene diisocyanate, decamethylene diisocyanate, cyclopentylene-1,3-diisocyanate, 1,4-diisocyanato cyclohexane, p-phenylene diisocyanate, m-phenylene diisocyanate, the tolylene diisocyanates e.g. 2,4, 2,6 or 1,6 tolulene diisocyanate, the naphthalene diisocyanates e.g. 1,4-naphthalene diisocyanate, 4,4'-diphenyl propane diisocyanate and 4,4-diphenylmethane diisocyanate.

The block copolymers of my invention are essentially linear, segmented, elastomeric copolymers comprising two principal types of segments chemically connected and alternating in the chemical chain. One segment, preferably essentially amorphous, may be derived from low melting soft polymers, such as, for example, polyesters, polyethers, and the like; the other segment is derived from the depolymerized, low molecular weight cellulose triacetate segments described hereinabove.

In particular, the soft segments of these elastomers are derived from low melting polymers having a melting point below about 60° C., having a molecular weight from about 250 to about 5,000, and containing terminal radicals possessing active hydrogen atoms. These soft segments, as present in the elastomer, appear as radicals of the initial polymers from which the terminal active hydrogen atoms have been removed. Generally, the hard, high melting segments comprise from about 20% to about 60% by weight of the segmented copolymer and may be defined as comprising at least one repeating unit of the linear hard polymer from which they are derived.

A suitable soft segment of the block copolymers of my invention may be represented by the formulae

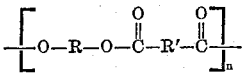

and

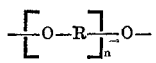

where R and R' are divalent organic radicals containing terminal functional groups possessing active hydrogen and n is such that the molecular weight ranges from about 250 to about 5,000.

Although the polyesters or polyethers or similar soft polymers can have a wide variety of treminal functional active hydrogen atoms, such as, for example, hydroxyl, amino, carboxyl and amido, I prefer to employ compounds terminated with carboxyl groups or hydroxyl groups. Thus when compounds with terminal hydroxyl groups are employed, the reaction of these compounds with the organic diisocyanate forms urethane links. Compounds terminated with carboxyl groups, on reaction with the organic diisocyanate, yield primarily amide linkages. The hard segments of the block copolymers are derived from the low molecular weight cellulose triacetate segments prepared as described previously.

The properties of the final block copolymer products depend essentially upon the particular components used in the reaction, the composition of the components in the reaction medium and the method of preparation of the block copolymers. Thus, for example, a determining factor in the properties of the block copolymers is the weight ratio of the low molecular weight cellulose triacetate to low molecular weight polyester or polyether. While the ratio of cellulose triacetate to polyester or polyether can vary over wide limits, a ratio of about 2:1 yields a flexible copolymer and a ratio of about 1:1 yields an elastic copolymer.

The amount of organic diisocyanate employed is also a critical factor in the determination of the properties of the final block copolymers. The amount of diisocyanate required will also depend on the weight ratio of triacetate to polyether or polyester. If the proper stoichiometry be used, however, soluble linear block copolymers can be obtained. Generally, when a diisocyanate is employed, a molar, ratio of diisocyanate to the polyester or polyether in a range from about 2.5:1 to 1.5:1 and preferably in a molar range from about 2:1 to 1.5:1 is utilized. I have found, however, that if an excess of diisocyanate is employed the reaction solution tends to gelatinize, but, the rate at which gelatinization takes place can be controlled by varying the concentration of the other reactants in the reaction solution and also by varying the temperature. In those situations where the reaction solution gels, it is believed that cross-linking has taken place resulting in a polymer having a three-dimensional network.

The polymerization reaction of my invention can be carried out in a medium comprised of an organic solvent, particularly halogenated hydrocarbons, such as, for example, chlorinated lower alkylenes. I have found that the employment of ethylene chloride or methylene chloride or mixtures thereof to be extremely desirable as a reaction medium. Advantages of employing ethylene chloride and/or methylene chloride will be discussed below.

The polymerization step of my invention is catalyzed by tertiary amines, such as, for example, triethylamine, tributylamine and N-methylmorpholine. Further, the polymerization reaction can be carried out at room temperature or at an elevated temperature and at an atmospheric pressure or at autogenous pressure.

The organic diisocyanate can be added to a solution of the low molecular weight cellulose triacetate and low molecular weight polyester or polyether. Alternatively, the organic diisocyanate can be first reacted with a low molecular weight cellulose triacetate to give blocks having residual isocyanate groups and these blocks in turn reacted with the low molecular weight polyester or polyether. Still another sequence of addition is first reacting the organic diisocyanate with the low molecular weight polyester or polyether to give blocks having residual isocyanate groups and then reacting these blocks with the low molecular weight cellulose triacetate. It is believed that the first sequence tends to give random type block copolymers whereas the other two sequences tend to give more orderly alternating block copolymers. I prefer first to react the organic diisocyanate with the low molecular weight polyester or polyether at a temperature in the range of from about 80° to about 120° C. to produce isocyanate capped blocks and then react the capped blocks with the low molecular weight cellulose triacetate at a temperature in the range of from about 25° to about 80° C. Whichever sequence of addition is selected, however, it is most desirable that the reactions be carried out under anhydrous conditions in an inert atmosphere, such as, for example, dry nitrogen.

An advantage of employing methylene chloride and/or ethylene chloride as the reaction medium is that these compounds are excellent solvents for the final block copolymers as well as for the reactants. Furthermore, the use of such solvents permits the reaction system to be conveniently dried by azeotropic distillation prior to adding the organic diisocyanate. Generally, this procedure consists of dissolving a low molecular weight polyester or polyether in a small amount of the ethylene chloride and then drying the system by azeotropic distillation leaving a more highly concentrated solution of the polyester or polyether. The organic diisocyanate is then added and reacted with the polyester or polyether. Meanwhile, in a separate vessel the low molecular weight cellulose triacetate is disoslved in methylene chloride and/or ethylene chloride, and this system is also dried by azeotropic distillation. Still further drying can be accomplished by passing the solution through a bed of silica gel. After the reaction of the low molecular weight polyester or polyether with the organic diisocyanate is substantially completed, the dry solution of low molecular weight cellulose triacetate in the chlorinated hydrocarbon is added for reaction.

I have found that the rate of reaction is catalyzed by tertiary amines but is also dependent upon the concentration of the reactants in the solution and the temperature. Secondarily, the rate of reaction is also dependent upon the amount of organic diisocyanate present. Polymerization is evidenced initially by an increase in the viscosity of the solution and in the final aspects by an increase in the I.V. of the final reaction product. Generally, the conditions for increased rate of reaction are high temperature, high concentration of reactants and excessive amounts of organic diisocyanate. In some instances, however, it is actually desirable to retard the reaction in the later stages of polymerization, particularly when excessive amounts of organic diisocyanates are employed. Reaction inhibition can be conveniently accomplished by diluting the reaction solution and/or carrying out the reaction at lower temperatures. The purpose of retarding the polymerization reaction in the later stages when employing an excess of diisocyanate is to prevent gelation. In such instance the reaction solution can then be cast directly into films and after film formation the reaction can then be continued to completion.

The block copolymers obtained according to this invention have sufficiently higher I.V.'s than those of the starting materials and the preferred product copolymers are soluble in several of the well-known organic solvents, such as, for example, chlorinated hydrocarbons and dimethyl formamide. If the reaction solution gels, however, the product of the reaction is no longer soluble in the above-mentioned solvents but will swell to transparent gels. In such instances, I have found that hot dimethyl formamide (steam bath) will "degelatinize" the swollen gels resulting in a smooth but comparatively low viscosity solution. On precipitation in water or ethyl alcohol, filtering and drying, the "degelatinized" products do not have properties as desirable as those of the products isolated before gelation takes place, and, therefore, gelation is generally to be avoided.

The preferred block copolymer products of my invention generally soften and melt at temperatures below that for high molecular weight cellulose triacetate. Generally, the higher the weight ratio of low molecular weight cellulose triacetate to low molecular weight polyester or polyether the higher is the melting point of the product. Thus, for example, a product obtained from a 1:1 ratio may have a melting point of about 240° C., while a product obtained from a 2:1 ratio may have a melting point of about 275° C.

Films of the product cast from a 9/1 methylene chloride-methanol (w./w.) solution are generally clear and practically colorless. Such films exhibit excellent flexibility although the degree of flexibility is highly dependent on the weight ratio of low molecular weight cellulose triacetate to low molecular weight polyester or polyether employed in the formulation. Generally, a weight ratio of about 1:1 usually results in elastic films, while a weight ratio of about 2:1 usually gives tough films having very good tensile strength and elongation.

The typical X-ray diffraction pattern of a block copolymer made from the low molecular weight cellulose triacetate, a polyester prepared from equimolar amounts of diethylene glycol and adipic acid, and toluene diisocyanate is summarized as follows: the cellulose triacetate-flexible ester urethane block copolymer has the cellulose triacetate sections arranged in well ordered, crystalline blocks. During film formation this order is largely destroyed, but it can be regenerated during heat treatment at about 120° C. Stretching of the films by about 400 to 800% yields oriented non-crystalline samples for non-heat treated films and oriented samples containing oriented crystalline blocks of cellulose triacetate for heat treated films.

It should be noted that the process of my invention is not restricted to the preparation of the block copolymers described previously, said copolymers, by definition, comprising alternating soft and hard segments. My invention also contemplates the formation of copolymers of cellulose triacetate wherein the soft and hard segments do not alternate but rather one of these segments constitutes a predominant part of the copolymer chain uninterrupted by the other in a random type polymerization. The copolymers may even consist solely of an interior segment of the cellulosic and exterior segments of the polyether or polyester, or an interior polyether or polyester segment bonded to exterior cellulosic segments.

Suitable polymers in the molecular weight range of about 250 to about 5,000 which may be employed in virtually any proportion with the low molecular weight cellulose triacetate include, for example, poly(tetramethylene oxide) glycols, poly(hexamethylene oxide) glycols, poly(propylene oxide) glycol, poly(ethylene oxide) glycol, polyethylene adipate, polyester of diethylene glycol and adipic acid, polyethylene sebacate and polyester of diethylene glycol and sebacic acid.

In summary, then, I have obtained low molecular weight cellulose triacetate through the depolymerization of higher molecular weight triacetate. In addition, I have employed such low molecular weight cellulose triacetate to prepare block copolymers which can be formed into films exhibiting enhanced characteristics of clarity, flexibility, and strength. These films find a number of applications such as, for example, in packaging, particularly where sparkling, clear films are desired, and in coating where flexible strong films are desired.

The following examples will further illustrate the embodiments of my invention.

The first nine examples relate to the aspect of my invention wherein high molecular weight cellulose triacetate is depolymerized in the boron trifluoride-chlorinated hydrocarbon system.

Example I

A solution of 20 grams of cellulose triacetate (A.V.—62.5%, I.V. regenerated—1.8) in 200 grams of ethylene chloride and 30 grams of recrystallized trioxane was brought to the reflux temperature of about 82° C. and then 0.5 ml. of boron trifluoride ethyl ether complex (47% $BF_3$) was added (1.25% by weight, of boron trifluoride as based on the cellulose triacetate). The solution was maintained at a mild reflux at 82° C. for two hours during which time the viscosity of the solution decreased and white polyoxymethylene precipitated from solution. The boron trifluoride catalyst was then neutralized by adding 1 ml. of tributylamine. The solution was cooled, filtered and 11.85 grams of a white residue having a formaldehyde odor was removed. The remaining clear, thin, almost colorless filtrate was evaporated to dryness at room temperature yielding a brittle, white, opaque solid weighing 22.07 grams. This solid was digested with water on a steam bath for seven hours, collected by filtration through a sintered glass filter and vacuum dried at 60° C. to yield a white, opaque, granular, solid depolymerized cellulose triacetate product weighing 18.07 grams. Analysis of the product indicated a Rast molecular weight of 870, an A.V. of 59.1%, and an oxymethylene content of 5.6%. The product also analyzed for 48.4% C. and 5.7% H. The product was soluble in methylene chloride and acetone, and melted at 210–230° C. with practically no discoloration.

Example II

A quantity of cellulose triacetate (A.V.—62.5%, I.V regenerated—1.8) weighing 40 grams was vacuum dried at 60° C. and dissolved in 400 grams of freshly distilled ethylene chloride by heating to 75° C. with agitation. A portion of dried trioxane weighing 60 grams was then dissolved in the solution. A 1 ml. portion of boron trifluoride-etherate complex catalyst (47% $BF_3$) was added to the solution at 75° C. The solution was maintained at 75° C. for a period of two hours during which time a white precipitate was formed. The catalyst was neutralized by adding 2 ml. of tributylamine and the suspension was filtered to obtain a clear, almost colorless, thin filtrate which was separated and evaporated to dryness. A viscous, sticky syrup was obtained which hardened to a white solid upon treatment with water and 2B alcohol (i.e., denatured ethyl alcohol having 0.5 gallon of benzene in each 100 gallons of ethanol) on the steam bath for about one hour. After filtering and drying, the white product weighed 46.1 grams. This product pulverized readily to a fine white powder. Upon further digestion with distilled water on a steam bath for four hours, filtering and drying the white powdery depolymerized cellulose triacetate product obtained weighed 36.2 grams. This product became completely translucent and colorless at 170–180° C. on the melting block and then flowed easily as the temperature was increased. It was still colorless at 230° C. The product analyzed for an A.V. of 56.6%, a Rast molecular weight of 1446, and an oxymethylene content of 9.4%.

Example III

A 20 gram portion of cellulose triacetate containing 2% moisture (A.V.—62.5%, I.V. regenerated—1.8) was dissolved in 200 grams of ethylene choride at 70° C. A 0.5 ml. portion of boron trifluoride-etherate (47% $BF_3$) catalyst was added and the solution was maintained at 70° C. for 7½ hours. The catalyst was then neutralized by adding 1 ml. of tributylamine after which the solution was poured into an excess that is, about 500 ml. of 2B alcohol resulting in the precipitation of a white fluffy solid. After filtration and digestion with water on the steam bath, the low molecular weight cellulose triacetate product was vacuum dried and weighed 19.66 grams. The product analyzed for an A.V. of 61.5% and a regenerated I.V. of 0.49.

Example IV

An 80 gram portion of cellulose triacetate (A.V.—62.4%, I.V. regenerated—1.94) was dissolved in a warm mixture of 1052 grams of ethylene chloride and 67 grams of methylene chloride. The system was dried by azeotropic distillation of the solution at atmospheric pressure with removal of 150 ml. of azeotropic distillate. The solution was then cooled to 75° C. and 80 grams of dry dioxolane (dried over sodium wire) were added. To the resulting solution was then added 2.0 ml. of boron trifluoride-ethyl ether complex.

This reaction solution was maintained at 75° C. for 15 hours. The solution was then cooled to 30° C. and 0.3 ml. of water was added. After five minutes, 2.1 grams of sodium bicarbonate and 5 ml. of water were added. The solution was agitated for 10 minutes and then transferred to an evaporating dish and evaporated to dryness. The resulting pale yellow solid was soaked in 2B alcohol to remove the color. The resulting white solid was collected and digested with a liter of water on a steam bath for two hours. After filtering and vacuum drying at 60° C., there was obtained a white, opaque, granular solid weighing 75.1 grams. The product analyzed for an A.V. of 59.4%, 1.04% oxymethylene content, 0.57% hydroxyl content and an I.V. of 0.15. The product was soluble in methylene chloride and partly soluble in acetone. The product melted at 265–282° C. with disappearance of bi-refringence; however, bi-refringence reoccurred upon cooling of the specimen.

Example V

An 80 gram portion of commercial grade cellulose triacetate (A.V.—61.5%, I.V. regenerated—2.0) was dissolved in a mixture of 1052 grams of ethylene chloride and 67 grams of methylene chloride. After azeotropic distillation to effect drying, during which 150 ml. of distillate were collected, the solution was cooled at 75° C. and 80 grams of dried dioxolane were added. After adding 2.0 ml. of boron trifluoride-ethyl ether complex (47% $BF_3$), the solution was agitated at 75° C. for 22 hours. The solution was neutralized and the product recovered using the same reagents and procedure described in Example IV. A granular, white opaque solid weighing 79.1 grams was obtained. The product analyzed for an A.V. of 59.4%, 0.54% hydroxyl content, 1.14 oxymethylene content, an I.V. of 0.18, and a molecular weight of about 3400. The low molecular weight cellulose triacetate product was soluble in methylene chloride or methylene chloride-methanol, partially soluble in acetone and moderately soluble in hot dioxane. The product melted at 270–280° C. with slight yellowing. X-ray diffraction analysis of the product showed it to be crystalline and possessing the crystal structure of cellulose triacetate II.

Example VI

A 20 gram portion of high molecular weight cellulose triacetate (A.V.—62.4%, I.V. regenerated—1.94) was dissolved in a warm mixture of 263 grams of ethylene chloride and 20 grams of methylene chloride. The solution was heated with stirring to boiling and 50 ml. of distillate were removed. The solution was then cooled to 75° C. and 2 grams of dioxolane (dried over sodium wire) were added. Then 0.5 ml. of boron trifluoride-ethyl ether complex (47% $BF_3$) was added. The solution was agitated at 75° C. for one and a half hours during which time the viscosity decreased to a water thin solution which became yellow-brown in color. The solution was cooled to 30° C. and 0.6 ml. of triethylamine was added to neutralize the catalyst. The color of the solution became somewhat lighter when the catalyst was neutralized. The solution was then evaporated to dryness yielding an easily friable, brittle, yellow solid weighing 22.6 grams. The solid was agitated in a Waring Blender with distilled water, filtered, washed with water and dried to produce a yellow granular solid weighing 21.1 grams. This solid was then soaked in 2B alcohol, collected and dried to provide a pale yellow solid weighing 19.3 grams which was then digested with water on the steam bath. The final product analyzed for an A.V. of 61.3%, hydroxyl content of 0.47%, an oxymethylene content of 0.2% and an I.V. of 0.26. The product was soluble in methylene chloride, partially soluble in acetone and warm dioxane, and melted at 285–290° C. with slight yellow discoloration.

Example VII

The same procedure as described in Example VI and employing the same reactants was followed in this example with the exception that the dioxolane was omitted from the reaction solution. The product was isolated by evaporation of the solvent and weighed 22.9 grams. After agitation with distilled water and drying, there resulted a brown granular solid weighing 22.0 grams. After a 2B alcohol soak there resulted a tan colored solid weighing 20.6 grams. After water digestion on the steam bath, collection and drying in vacuo at 60° C., there was obtained a light tan solid weighing 20.0 grams. This product analyzed for an A.V. of 62.5%, hydroxyl content of 0.69% and an I.V. of 0.25. The product was soluble in methylene chloride, actone and warm dioxane and melted to a yellow, easily flowable, clear liquid between 250 and 260° C.

Example VIII

Twenty grams of cellulose triacetate (A.V.—62.5% and I.V.—1.5 dl./g. in 9/1 methylene chloride/methanol) containing 1.8% moisture were dissolved in 263 grams dry ethylene chloride. After solutioning, 20 grams of dry dioxolane were added. The solution was heated to 75° C. and then 2 ml. of boron trifluoride-etherate catalyst added, the catalyst solution containing 47% $BF_3$ by weight.

The solution, which was clear and practically colorless, was maintained at 75° C. for 13 hours during which time the viscosity slowly decreased. The solution was cooled to 30° C. and then the catalyst was neutralized by adding 2.4 mls. triethylamine.

The solution was evaporated in the hood to yield a light yellow, transparent solid weighing 26.6 grams. This product was soaked in a mixture of 40 mls. of 2B alcohol and 20 ml. of acetone for 2½ hours, then filtered yielding a pure white residue. The white residue was then digested with water in the steam bath for about 3 hours, filtered and vacuum dried at 60° C. The resulting pure white solid weighed 18.45 grams and melted at about 260° C.

The product analyzed for 60.4% A.V., 0.80% hydroxyl content, 0.4% oxymethylene, an I.V. of 0.39 in 9/1 methylene chloride/methanol and a Rast molecular weight of 5,600.

Example IX

A 40 gram portion of cellulose triacetate (A.V.—62.3%, I.V.—1.21 dl./g. in 9/1 methylene chloride/methanol) was dissolved in 526 grams of ethylene chloride by agitation and heating. The solution was heated to boiling and 50 ml. of ethylene chloride-water azeotrope were removed. The solution was then cooled to 75° C. and 40 grams of dry dioxolane (dried over sodium) were dissolved. A 1.0 ml. portion of boron trifluoride-etherate catalyst (47% $BF_3$) was added. The reaction solution was maintained at 73–75° C. for eleven hours and then permitted to stand at room temperature for sixteen hours. A volume of 0.15 ml. of water was added at 30° C. and the solution agitated for five minutes and the catalyst was then neutralized with 1.2 ml. of triethylamine. After catalyst neutralization, the solution was evaporated to dryness yielding a pale yellow, brittle solid which was broken up and soaked in 2B alcohol to extract the color. After filtering and drying, there remained a white granular solid weighing 34.9 grams. The solid was digested with distilled water on a steam bath for three and one-half hours, filtered and vacuum dried at 60° C. to produce a white, granular solid weighing 33.2 grams. This product analyzed for an A.V. of 59.1%, hydroxyl content of 0.74%, an oxymethylene content of 1.1%, an I.V. of 0.12 and a Rast molecular weight of 4,600.

Infra-red analysis carried out on films cast from ethylene chloride solutions containing about 10% of depolymerized cellulose triacetate, by weight, showed hydroxyl absorption at 2.88 m. indicating the hydroxyl absorption to be mostly due to secondary cellulose triacetate hydroxyls and/or —O—$CH_2OH$ groups rather than primary cellulose triacetate hydroxyls and/or

—O—$CH_2$—$CH_2$—OH groups.

In casting films for infra-red analysis, the low molecular weight cellulose triacetate was simply dissolved in solvent, cast on a glass plate and the solvent evaporated at room temperature.

The following examples, X through XIII, relate to the aspect of my invention wherein high molecular weight cellulose triacetate is depolymerized in the acetic acid-water system.

Example X

In this example, four separate 20 gram samples of cellulose triacetate (A.V.—62.5%, I.V.—1.55 dl./g. in 9/1 methylene chloride/methanol) were depolymerized in acetic acid solutions. Each of the samples of cellulose triacetate was dissolved in 200 grams of hot glacial acetic acid (99.9%). A quantity of 3.3 ml. of acetic anhydride was then added to each of the solutions in order to react with the moisture of the cellulose triacetate, the water in the glacial acetic acid and the water in the acid catalyst. A 1.0 ml. quantity of concentrated sulfuric acid catalyst was then added to each of the solutions. No water was added to the first solution; however, two minutes after the addition of the catalyst 0.4, 0.8 and 1.2 ml. of water were added to the second, third and fourth solutions, respectively. Each of these clear solutions was then heated with agitation at 80° C. for a period of seven hours after which the solutions were cooled to 35° C. and the catalyst neutralized by adding 15 grams of a 21% aqueous solution of magnesium acetate to each of the reaction solutions. The product work-up of each reaction solution consisted of evaporation in a hood to near dryness, a first wash with petroleum ether, a second wash with 2B alcohol and a final wash with tap water. Each of the four products was then dried in a vacuum oven at 60° C. The white powdery products were tested for solubility, melting point and subjected to analysis. Results are shown in the following table:

TABLE I

|   | 1 | 2 | 3 | 4 |
|---|---|---|---|---|
| Composition of Depolymerization Solvent, Percent: | | | | |
| Acetic Acid | 100 | 99.8 | 99.6 | 99.4 |
| Water | | 0.2 | 0.4 | 0.6 |
| Product Solubility in Methylene Chloride | Yes | Yes | Yes | Yes |
| Product Solubility in Acetone | No | No | No | No |
| Melting Point, ° C. (Block) | 212–220 | 194–200 | 180–185 | 215–225 |
| Acetyl Value, Percent Acetic Acid | 66.5 | 65.6 | 63.5 | 61.4 |
| Hydroxyl Content, Percent | 0.16 | 0.67 | 1.10 | 1.52 |
| Rast Molecular Wt | 1,720 | 2,030 | 1,990 | 2,120 |
| I.V. (9/1 Methylene Chloride/Methanol), dl./g | 0.12 | 0.10 | 0.16 | 0.13 |

Example XI

Following the procedure outlined in Example X depolymerization of high molecular weight cellulose triacetate (A.V.=62.5%; I.V.=1.55 dl./g. in 9/1 methylene chloride/methanol) were carried out in solutions of 99.4% acetic acid—0.6% water, 99.5% acetic acid—0.5% water and 99.55% acetic acid—0.45% water. The analysis of the products obtained are given in the following table:

TABLE II

| Composition of Depolymerization Solution, Percent: | | | |
|---|---|---|---|
| Acetic Acid | 99.55 | 99.5 | 99.4 |
| Water | 0.45 | 0.5 | 0.6 |
| Acetyl Value, Percent Acetic Acid | 63.5 | 62.5 | 62.6 |
| Hydroxyl Content, Percent | 1.28 | 1.45 | 1.70 |
| Rast Molecular Weight | 1,940 | 1,950 | 1,777 |
| I.V. (9/1 Methylene Chloride/Methanol) | 0.07 | 0.13 | 0.08 |

Example XII

Again, following the procedure employed in Example X another series of depolymerizations of high molecular weight cellulose triacetate (A.V.=62.5%; I.V.=1.55 dl./g. in 9/1 methylene chloride/methanol) were conducted in order to determine the optimum acetatic acid-water composition. A series of test runs were made in which the composition was varied from 99.5% acetic acid-0.5% water to 99.3% acetic acid-0.7% water. The depolymerizations were conducted at 80° C. for six hours. The analytical results of the products are shown in the following table.

TABLE III

| Acetic Acid/Water, Percent Comp. | Product Yield | A.V., Percent Acetic Acid | Percent Hydroxyl Content | I.V. | Rast., M.W. |
|---|---|---|---|---|---|
| 99.5/0.5 | 99 | 62.7 | 1.20 | 0.18 | 1,690 |
| 99.45/0.55 | 95 | 61.8 | 1.22 | 0.23 | 2,290 |
| 99.4/0.6 | 91 | 62.2 | 1.30 | 0.19 | 2,310 |
| 99.35/0.65 | 91 | 61.4 | 1.33 | 0.22 | 2,360 |
| 99.3/0.7 | 91 | 61.2 | 1.34 | 0.23 | 2,470 |

Example XIII

A 200 gram portion of high molecular weight cellulose triacetate (A.V.—62.5%, I.V.—1.35 dl./g. in 9/1 methylene chloride/methanol) was dissolved in 2000 grams of glacial acetic acid (100%) by heating and agitation. To this solution were added 23.8 grams of acetic anhydride to react with the moisture in the cellulose triacetate and water in the acid catalyst. The mixture was heated to 60° C. and 2 ml. of 70% perchloric acid were added as catalyst. Five minutes after adding the catalyst, 12 ml. of water were added and the clear solution was then heated with agitation at 80° C. for five hours. The thin, clear solution was then cooled to 50° C. and 5.5 ml. of pyridine were added to neutralize the catalyst. The neutralized solution was allowed to stand overnight at room temperature. The depolymerized cellulose triacetate product was precipitated by pouring the neutralized solution into 3.5 liters of low boiling petroleum ether. A sticky precipitate settled and the supernatant liquid (petroleum ether-acetic acid) was decanted off leaving a sticky solid containing residual acetic acid. The solid was placed in a hood overnight to remove the residual acetic acid. The remaining white, hardened product was soaked for fifteen minutes in 250 ml. of 2B alcohol, filtered and then thoroughly washed with water. After drying at 50° C. in a vacuum oven there was obtained 189.5 grams of a white powder. The low molecular weight cellulose triacetate product analyzed for an A.V. of 62.5%, an hydroxyl content of 0.78%, an I.V. of 0.17 and a Rast molecular weight of 4,090. The product was soluble in methylene chloride, insoluble in acetone and melted about 260–270° C.

In the following Examples XIV through XXI, another aspect of my invention is illustrated wherein the low molecular weight cellulose triacetate fragments are employed in the preparation of block copolymers.

Example XIV

Following the procedure described in Example IX, a batch of depolymerized low molecular weight cellulose triacetate was prepared. This low molecular weight cellulose triacetate had a Rast molecular weight of 4,095, a hydroxyl content of 0.57%, an I.V. of 0.27 and an A.V. of 60.7%. The oxymethylene content of the fragment was 0.67%. A portion of this low molecular weight cellulose triacetate weighing 189 grams was dissolved in a mixture of 900 ml. of methylene chloride and 450 ml. of ethylene chloride. The solution was heated with stirring and azeotropically distilled to dry the system. About 450 ml. of distillate were collected.

Into another vessel equipped with stirrer, thermometer, nitrogen inlet and Stark and Dean trap with condenser and drying tube attached, were charged 95 grams of a polyester prepared from equimolar amounts of diethylene glycol and adipic acid, (mol. wt. about 2800 hydroxyl content—1.21%, and I.V.—0.10). A volume of 150 ml. of ethylene chloride was then added to the vessel and the solution was heated with stirring and was azeotropically distilled in order to dry the system. There remained a concentrated polyester solution of about 75% concentration. The temperature was reduced to 80° C. as a flow of dry nitrogen was passed through the reaction vessel. To the concentrated polyester solution were added 9.7 ml. of toluene diisocyanate. This solution was heated with good agitation at 80° C. for three hours. The solution was cooled to 50° C. and then the dry solution of low molecular weight cellulose triacetate in the mixture of ethylene chloride and methylene chloride was added. This reaction mixture was heated with stirring, and distillation was carried out until a temperature of 75° C. was reached. A volume of 400 ml. of distillate was collected. A volume of 200 ml. of dry ethylene chloride was added to the reaction solution followed by the addition of 2 ml. of triethylamine catalyst. The solution was then heated with stirring at 75° C. for thirty-one hours during which time the viscosity increased yielding a heavy viscous dope at the end of the reaction time. Upon cooling to room temperature the reaction mass became a semi-solid.

A 400 ml. volume of methylene chloride was added to the semi-solid mass with stirring to yield a smooth, moderately viscous dope from which films could be cast directly. Upon drying, such films were slightly hazy but did not have any visual gels. The remaining dope, not employed in casting films, was added to 2 liters of 2B alcohol to form a soft and fibrous precipitate. The precipitate was collected, washed with 2B alcohol, then soaked in a mixture of two volumes of 2B alcohol and one volume of acetone for three hours. The product was collected by filtration and then dried at 60° C. under vacuum.

The off-white fibrous product was soluble in methylene chloride giving a clear solution and films cast from this solution were sparkling clear, flexible and fairly strong. For example, films about 2 mils in thickness had a tensile strength of 6000 p.s.i. and an elongation of 150%.

The I.V. of the product block copolymer was 1.17 dl./g. as measured in 9/1 methylene chloride/methanol. Using a melting point block, a sample of the copolymer became transparent at about 275° C. and melted with flow at about 280° C. but with some discoloration.

Example XV

Again, following the procedure of Example IX, a batch of depolymerized low molecular weight cellulose triacetate was produced. This low molecular weight cellulose triacetate had a Rast molecular weight of 2700, a hydroxyl content of 0.54%, an I.V. of 0.16, and an A.V. of 59.7. The oxymethylene content of the fragment was 0.93%. A 240 gram portion of this cellulose triacetate was dissolved in a mixture of 1200 ml. of methylene chloride and 600 ml. of ethylene chloride. The solution was heated with agitation and azeotropically distilled to dry the system. About 600 ml. of distillate were collected.

Into another vessel equipped with stirrer, thermometer, nitrogen inlet and Stark and Dean trap with condenser and drying tube attached, were charged 240 grams of the same polyester employed in Example XIV together with 150 ml. of ethylene chloride. The solution was heated with agitation to about 100° C. and the azeotrope of ethylene chloride-water was removed. The solution was then cooled to 80° C. as a flow of dry nitrogen was admitted to the reaction flask containing the concentrated polyester solution (about 75% concentration). A volume of 18 ml. of toluene diisocyanate was added and the solution was then heated with agitation at 80° C. for three hours.

The dry solution of low molecular weight cellulose triacetate in the ethylene chloride-methylene chloride mixture was added to the reaction solution at 55° C. Distillation proceeded as the temperature was increased to 70° C. at which temperature the distillation was stopped. A total of 520 ml. of distillate was recovered. A 2 ml. quantity of triethylamine was added to the reaction solution, which was then heated with stirring at 70° C. for five hours. The reaction mixture was allowed to stand overnight (16 hours) at room temperature under dry nitrogen. The solution was then heated at 70° C. with agitation for eight hours. Upon cooling to room temperature the solution became semi-solid.

The semi-solid solution was diluted by adding 800 ml. of methylene chloride thereby providing a smooth, gel free, pale yellow, clear solution. Films cast from this solution were clear and elastic after evaporation of the solvent. The remaining solution was precipitated in 2B alcohol to provide a rubbery fiber which was collected, washed with 2B alcohol and then soaked in a mixture of two volumes 2B alcohol and one volume of acetone for four days. The product was collected by filtration and dried at 60° C. under vacuum to yield an off-white copolymer weighing 439 grams.

The block copolymer product was soluble in methylene chloride and also a 9/1 mixture of methylene chloride and methanol. Films cast from the latter solution were sparkling clear and elastic. For example, a film about 2 mils in thickness had a tensile strength of about 3580 p.s.i., and an elongation of about 1060%. The block copolymer product had an I.V. of 1.29 dl./g. and a melting point of 250–260° C.

Example XVI

A 20 gram portion of a low molecular weight cellulose triacetate produced by the method described in Example IX and having a Rast molecular weight of 2740, a hydroxyl content of 0.69, an I.V. of 0.19 and an A.V. of 58.8 was dissolved in 100 ml. of methylene chloride and 50 ml. of ethylene chloride. The oxymethylene content of the fragment was 0.85%. The system was dried by azeotropic distillation and a total of 50 ml. of distillate was removed.

Into a separate vessel equipped with stirrer, thermometer, nitrogen inlet, Stark and Dean trap and condenser with drying tube attached, were charged 20 grams of polypropylene glycol (molecular weight—2000 and hydroxyl number—56.4). A 25 ml. volume of ethylene chloride was added to the vessel and the solution was heated with agitation. The solution was azeotropically distilled and a volume of 19 ml. of distillate was collected. The vessel was then swept with dry nitrogen and 3.75 grams of methylene bis (4-phenyl isocyanate) were added. The reaction mixture was heated with agitation at 105° C. for three hours and then cooled to 50° C. at which temperature the dry low molecular weight cellulose triacetate solution was added. The entire reaction mixture was then heated to 70° C. and 20 ml. of distillate were collected. A volume of 0.3 ml. of triethylamine was added and the reaction mixture was continuously stirred at 70° C. for forty-five hours. There resulted an almost clear, colorless viscous dope. The reaction was stopped and the contents of the vessel were then permitted to stand at room temperature under a dry nitrogen atmosphere for three days. No gelation took place. The dope was diluted with 100 ml. of ethylene chloride and from this solution films about 2 mils in thickness were cast which were fairly clear and elastic. The tensile strength and elongation of the films measured 1,840 p.s.i. and 570% respectively.

The remaining dope was precipitated in excess 2B alcohol, yielding a gelatinous-appearing precipitate that was removed by centrifugation. This was washed further with more 2B alcohol and then vacuum dried at 60° C.

The off-white polymer has an I.V. of 0.94 dl./g. in 9/1 methylene chloride/methanol and melted at about 205–215° C. with yellowing. Films cast from methylene chloride had a tensile strength and elongation of 2,420 p.s.i. and 590%, respectively.

Example XVII

The procedure of Example XVI was again repeated with the exception that 20 grams of the polyester employed in Examples XIV and XV were used instead of the polypropylene glycol and only 2.67 grams of methylene bis(4-phenyl isocyanate) were used. The white product had an I.V. of 0.74 dl./g. in 9/1 MeCl$_2$/MeOH and a melting point of 225–235° C. Films cast from the solution of the block copolymer product in a 9/1 mixture of methylene chloride and methanol were sparkling clear. A 2.5 mil film had a tensile strength of 3820 p.s.i. and an elongation of 970%.

Example XVIII

Again the reactants and the procedure described in Example XVI were employed in this example with the exception that 20 grams of the polyester described in Examples XIV and XV were used instead of the polypropylene glycol of Example XVI and 2.96 grams of methylene bis (4-phenyl isocyanate) were used. The heating time of the polymerization reaction and also the concentration of the reactants during polymerization were different. In this example the reaction mixture was heated for eight hours at 70° C., then diluted with 50 ml. of ethylene chloride and then heating and agitation were resumed for 40 hours at 70° C. Films about 2 mils in thickness were cast from the cooled reaction solution and were clear and elastic. One of the films was further heated at 110° C. for three and one-half hours and tests of the tensile strength and the elongation of the heated and unheated films were made. The I.V. of the polymer prepared was 0.86 dl./g. in 9/1 methylene chloride/methanol and the melting point was about 230–240° C.

TABLE IV

| | Tensile Strength, p.s.i. | Elongation, Percent |
|---|---|---|
| Unheated | 3,820 | 938 |
| Heated | 4,680 | 864 |

Example XIX 20 grams of low molecular weight cellulose triacetate similar to that described in Example XIV (A.V.=58.1; hydroxyl content=0.73%; oxymethylene content=1.7%; mol. wt. =1080 and I.V.=0.14) was solutioned and dried in a manner similar to the procedures described in Example XV. The reaction of 20 grams of polyester and 2.47 grams of toluene diisocyanate in a 75% solution of the polyester in ethylene chloride was carried out in the manner described in Example XIV. After adding the low molecular weight cellulose triacetate solution, and agitating the reaction mixture at 70° C., the viscosity slowly increased after the triethylamine catalyst addition. After 48 hours a viscous partially gelled solution resulted.

This solution was cooled to room temperature and diluted with 100 ml. of methylene chloride and 50 ml. of ethylene chloride. Upon agitation for about two and one-half hours a clear, smooth, moderately viscous solution resulted. Films about 2 mils in thickness cast from the solution and air dried were clear and contained practically no gels. The tensile strength of the films was about 3000 p.s.i. and the elongation about 880%.

The remaining solution was precipitated in 2B alcohol to yield a fibrous product which was collected and washed with alcohol and dried at 60° C. under vacuum. The yield, including the weight of the cast films, was 40 grams. The precipitated and dried copolymer was insoluble in methylene chloride, dimethyl formamide, dimethyl sulfoxide and other solvents. In methylene chloride and dimethyl formamide the copolymer formed transparent gel particles. When the gelatinized solution in dimethyl formamide containing about 5% by weight, of copolymer was heated on the steam bath for about two to three hours a smooth but low viscosity solution resulted. When this solution was precipitated in 2B alcohol, washed with alcohol and dried, it became soluble in methylene chloride. Films cast from such solution were clear and gel free. The tensile strengths of these films were about 1750 p.s.i. and the elongations were about 860%.

Example XX

A high molecular weight cellulose triacetate having an I.V. of 1.35 dl./g. in 9/1 methylene chloride/methanol was depolymerized in a 99.4% acetic acid-0.6% water solution using a perchloric acid catalyst in the amount of 1% by weight based on the cellulose triacetate. The depolymerization reaction was conducted at a temperature of 75–80° C. for 6 hours. After neutralization of the catalyst with pyridine, precipitation of the low molecular weight triacetate in petroleum ether, thorough water washing and drying of the precipitate, there was obtained a white powdery product in 95% yield having an I.V. of 0.16 (hydroxyl content=0.78%; A.V.=62.2%; melting point=260° C.; molecular wt.=4,090).

A series of block copolymers were prepared by first capping a 75% solution in ethylene chloride of a polyester prepared from equimolar amounts of diethylene glycol and adipic acid and having an I.V. of 0.10 with each of toluene diisocyanate, methylene bis (4-phenyl isocyanate) and a mixture of the two diisocyanates at a temperature of 100° C. and then separately reacting each of the capped polyesters with portions of the dry, depolymerized cellulose triacetate in methylene chloride solutions (16% concentration) at 30–40° C. using 0.5% of triethylamine, by weight (as based on the weight of cellulose triacetate and polyester). After polymerization was completed, films were cast from each of the reaction solutions and measured for tensile strength and elongation. The remaining product solutions were precipitated in 2B alcohol and the resulting fibrous, rubbery products were washed with alcohol and dried. A methylene chloride solution was prepared from each of the dried copolymers and more films were cast for evaluation. The results of this evaluation together with the proportions of reactants employed are shown in the following table:

TABLE V

| Diisocyanate Used | Cellulose Triacetate/ Polyester, Wt. Ratio | Diisocyanate/ Polyester, Molar Ratio | Block Copolymer I.V. | Film Properties | | |
|---|---|---|---|---|---|---|
| | | | | Tensile Strength, p.s.i. | Elongation, Percent | Appearance |
| Methylene bis(4-phenyl isocyanate) | 1:1 | 1.5:1 | ² 1.13 | ¹ 6,130<br>² 5,150 | 850<br>660 | Clear and elastic. |
| 80% Methylene bis(4-phenyl isocyanate), 20% Toluene Diisocyanate. | 1:1 | 1.5:1 | ² 1.33 | ¹ 5,050<br>² 5,080 | 720<br>640 | Do. |
| Toluene Diisocyanate | 1:1 | 1.5:1 | ² 1.46 | ¹ 5,570<br>² 5,150 | 840<br>610 | Do. |
| Methylene bis(4-phenyl isocyanate) | 2:3 | 1.5:1 | ---- | ¹ 5,390<br>² 2,920 | 1,080<br>860 | Do. |
| Methylene bis(4-phenyl isocyanate) | 1:1 | 1:5:1 | ---- | ¹ 6,780<br>² 5,960 | 810<br>680 | Do. |

¹ Cast directly from the reaction solution.
² I.V.'s and films were obtained from solution of the precipitated, washed and dried polymer.

Example XXI

Cellulose triacetate (A.V.—62.5% and I.V.—1.5 dl./g. in 9/1 methylene chloride/methanol was depolymerized) in a manner similar to that described in Example XX. There resulted a white product having a M.W. of 2900, hydroxyl content of 1.10% and acetyl value of 62.4%.

Twenty grams of polytetramethylene glycol ether having a molecular weight of 2800 and hydroxyl content of 1.21% and 50 ml. of ethylene chloride were charged into a flask equipped with stirrer, nitrogen inlet and Stark and Dean Trap to which condenser and drying tube were attached. The solution was heated by means of an oil bath and 45 ml. of distillate removed by distilling the solution.

The solution was cooled to 80° C. with a simultaneous flow of dry nitrogen passing over the polyether. A weight of freshly distilled methylene bis-(4-phenyl isocyanate) amounting to 2.66 grams was added. The reaction mixture was heated at 75–80° C. for 16 hours. The solution was then cooled to about 30° C. and then a solution of 16 grams of the above low molecular weight cellulose triacetate in 157 grams of methylene chloride (previously dried by passing through a silica gel bed) was added to the reaction mixture.

The reaction solution was agitated at room temperature for 2 hours and then 0.3 ml. triethylamine catalyst added. Agitation was continued at room temperature for 74 hours yielding a viscous, pale yellow solution.

The dope was further concentrated by passing a rapid flow of nitrogen over the agitated dope until a semi-solid was obtained after about 4 hours. On diluting with 100 ml. methylene chloride, a uniform, clear dope was obtained.

The dope was agitated at room temperature overnight, then further diluted with 50 ml. methylene chloride and films cast from the reaction solution.

The dried films were about 2 mil thick and translucent. They were elastic and exhibited a fast recovery on stretching and releasing the stress. The films were tested and found to have a tensile strength of 3,400 p.s.i. and elongation of 67%.

The remaining polymer solution was precipitated by pouring into about one liter of 2B alcohol. The soft, swollen precipitate was washed thoroughly with alcohol and then vacuum dried at 60° C. There resulted a uniform, off-white rubbery solid melting at about 210° C.

The inherent viscosity of the product as measured in 9/1 methylene chloride/methanol was 1.2 dl./g.

The films cast from methylene chloride solutions of the above-described block copolymers are translucent and elastic. These films exhibit an extremely high degree of toughness, particularly those cast directly from the reaction solution.

The following examples describe the preparation of low molecular weight cellulose triacetate segments having modified terminal groups.

Example XXII 40 grams of cellulose triacetate (having a moisture content of 2.8%, acetyl value of 62.5%. acetic acid and an inherent viscosity of 1.74 dl./g. as measured in 9/1 MeCl$_2$/MeOH), was dissolved in 600 grams of ethylene chloride. The solution was heated to reflux with stirring and then 50 ml. of azeotrope distilled off to dry the system. The dry solution was cooled to 70° C. and then 1 ml. of BF$_3$-etherate solution having a BF$_3$ content of 47% was added. After one minute hydrogen sulfide gas was then continuously bubbled into the solution, the temperature being maintained at 70° C. After about 30 min. the solution became pink; the solution also appeared much lower in viscosity, the latter having slowly decreased since the addition of the catalyst. The solution slowly turned to red and then dark red in color. After 4 hours the heat was cut off and the solution (dark red in color) was cooled to room temperature. Upon the addition of pyridine to neutralize the catalyst, the solution color became very light yellow.

The thin solution was poured into excess petroleum ether which precipitated a white, finely divided solid. The latter was collected, washed with petroleum ether, methanol, cold water, methanol and then dried in a vacuum oven at 60° C. A sample of the snow-white powder (35 grams) melted at 225–230° with discoloration to orange-brown.

The powder has soluble in MeCl$_2$ giving a clear, colorless solution.

The powdery product analyzed as follows:

Acetyl value acetic acid _____percent__ 61.3
—OH/—SH content _____do____ 0.95
I.V. (9/1 MeCl$_2$/MeOH) _____ 0.11
Percent sulfur _____ 1.08

The product exhibited a major hydroxyl absorption at 3482 cm.$^{-1}$ under infrared analysis, believed to be secondary hydroxyl. Also, considerable 3.9 micron absorption was believed to be due to —SH.

Example XXIII

The same general procedure as Example XXII was carried out, except that the size of the batch was scaled up to 3 times that of Example XXII and the reaction time at 70° C. was 2⅓ hours. 112 grams of a white, powdery product was obtained.

The dried product (dried @ 60° C.) had an odor similar to hydrogen sulfide. It analyzed as follows:

Acetyl value acetic acid _____percent__ 62.2
—OH/—SH content _____do____ 0.99
Percent sulfur _____ 0.84
I.V. (9/1 MeCl$_2$/MeOH) _____dl./g__ 0.16

A sample of the product was placed in a dish and exposed to the atmosphere for 5 days. It still maintained an odor similar to hydrogen sulfide and the sulfur content of the sample now measured 0.65%.

A sample of the product was digested on the steam bath with water for about 6 hours, then collected and vacuum dried at 60° C. It was now odorless. The white sample analyzed as follows:

Acetyl value acetic acid _____percent__ 62.6
—OH/—SH content _____do____ 0.79
Percent sulfur _____ 0.48
I.V. (9/1 MeCl₂/MeOH) _____ dl./g__ 0.20

Examples XXIV–XXVII describe the depolymerization of cellulose triacetate in a reaction system containing hydroxyaryl compounds.

Example XXIV 40 grams of cellulose triacetate (containing 2.8% moisture and having an acetyl value of 62.5% HOAc and inherent viscosity of 1.58 dl./g. in 9/1 MeCl₂/MeOH) was dissolved in a mixture of 526 grams of ethylene chloride and 40 grams of methylene chloride with heating and stirring. After a clear solution was obtained it was heated to boiling and then azeotroped by removing 50 ml. distillate. The solution was cooled to 70° C. and this temperature maintained for the subsequent reaction.

5 grams of previously dried hydroquinone was added. After solutioning of the hydroquinone, 1 ml. of boron trifluoride-etherate solution containing 47% BF₃ was added (1.25 weight percent BF₃ based on the weight of the cellulose triacetate). After 1½ hours, the solution was cooled to 35° C. and then a small amount of triethylamine was added to neutralize the catalyst.

The reaction mixture was filtered and then added to petroleum ether to precipitate the product. The precipitate was collected and washed with petroleum ether, methanol, water, a mixture of methanol and petroleum ether and finally dried at 60° C. in a vacuum oven. The product (37.2 grams) was white and granular. The analyses were as follows:

Acetyl value HOAc _____percent__ 62.2
Hydroxyl conent _____do____ 0.33
Rast molecular weight _____ 2260
I.V. (9/1 MeCl₂/MeOH) _____ 0.27

Example XXV

Example XXIV was repeated, except that the reaction time was 3 hours. The white product (35.6 grams) was analyzed as follows:

Acetyl value HOAc _____percent__ 60.6
Hydroxyl content _____do____ 1.00
Rast molecular weight _____ 1990
I.V. (9/1 MeCl₂/MeOH) _____ 0.17

Example XXVI

The procedure of Example XXIV was repeated, except that 10 grams of hydroquinone were employed, the reaction time was 3 hours, and the solution was treated with ethylene oxide at 21° C. for 5 hours following the depolymerization. A white product (31.3 parts) was finally obtained which melted at 210–220° C. It had the following analyses:

Acetyl value HOAc _____percent __ 59.8
Hydroxyl content _____do____ 1.50
Rast molecular weight _____ 2690
I.V. (9/1 MeCl₂/MeOH) _____dl./g__ 0.07

Example XXVII

Example XXIV was repeated, employing 10 grams of bisphenol-A as the hydroxyaryl compound, and the reaction time was 3 hours. The product (30.4 parts) was white and melted at 200–215° C. yielding a clear, colorless melt. The product had the following analyses:

Acetyl value _____percent HOAc__ 58.3
Hydroxyl content _____percent__ 1.15
Rast molecular weight _____ 2120
I.V. (9/1 MeCl₂/MeOH) _____ dl./g__ 0.05

The infra-red spectrum showed the sample to be cellulose triacetate with absorptions at 6.2, 6.5 and 12.0 m. indicating the presence of bis-phenol A derivative. The relative intensities of the 12.0, 6.2 and 6.6 m. absorptions appear to be compatible with those of bis-phenol A.

The alcohol filtrate obtained when washing the main product was evaporated down giving a syrup. The syrup was extracted with ethyl ether to remove bis-phenol A. It was then washed with water which solidified it. After drying there was obtained a tan powdery solid (7.65 grams) having the following analyses:

Acetyl value _____percent HOAc__ 51.3
Hydroxyl content _____percent__ 2.54
Rast molecular weight _____ 1080

Example XXVIII

Eighty grams of cellulose triacetate (containing 2.7% moisture and having an acetyl value of 62.5% HOAc and inherent viscosity of 1.74 dl./g. in 9/1 MeCl₂/MeOH) were dissolved in a mixture of 1052 grams of ethylene chloride and 80 grams of methylene chloride with heating and agitation, and 100 ml. of distillate removed. The solution was cooled to 70° C., whereupon 15 grams of hydroquinone was dissolved in the solution and then 2 ml. of boron trifluoride-etherate catalyst added. Depolymerization was carried out at 70° C. for 3 hours. The solution was then cooled to 35° and the catalyst neutralized with pyridine.

The product was precipitated and washed in a manner similar to that described in Example XXIV. There was obtained 68.4 grams of white product having the following analyses:

Acetyl value _____percent HOAc__ 60.9
Hydroxyl content _____percent__ 0.75
Rast molecular weight _____ 3100
I.V. (9/1 MeCl₂/MeOH) _____ 0.15

Example XXIX

A block copolymer was prepared as follows:

30 grams of a polyester of adipic acid and diethylene glycol having substantially hydroxyl terminal groups and an average molecular weight of 2800 was dissolved in 50 ml. of ethylene chloride. The solution was heated with agitation and then azeotropically distilled (25 ml. of distillate). A flow of dry, oxygen-free nitrogen was introduced into the reaction flask as the temperature was reduced to 80° C., 4.26 grams of purified methylene di-p-phenyl diisocyanate was added, the reaction mixture maintained at 80° C. for 3 hours in a dry nitrogen atmosphere, and then cooled to 30° C.

20 grams of the low molecular weight cellulose triacetate of Example XXVIII was dissolved in methylene chloride and the solution dried by standing over silica gel overnight. The solution was filtered and added directly to the above reaction mixture. After 1 hour of agitation 0.3 ml. of triethylamine was added. The solution was agitated at 22° C. for 48 hours and then at 40° C. for 20 hours. One ml. of toluene diisocyanate was added and the solution agitated at 33° for 72 hours. There resulted a highly viscous mass that tended to wrap up on the stirrer with agitation.

The viscous mass diluted with 300 ml. methylene chloride giving a clear, moderately viscous solution. A film cast from the solution was clear, elastic, and had a tensile strength of 3,810 p.s.i. and elongation of 1,170%.

The remaining dope was added to excess methanol which precipitated the fibrous but rubbery precipitate. The product was collected, washed with methanol and dried at 60° C. under vacuum.

The product was redissolved in methylene chloride and films cast. The dried films were crystal clear, and exhibited tensile strengths of 4,120 p.s.i. and elongations of 1000%.

The product had an inherent viscosity of 1.00 dl./g. as measured in 9/1 MeCl₂/MeOH.

Example XXX 40 grams of cellulose triacetate (having an acetyl value of 62.5, and an inherent viscosity of 1.72 l./gm.) was dissolved in 400 ml. of ethylene chloride with heating and agitation. The solution was azeotroped to remove water— 50 ml. of distillate was removed. The clear solution was cooled to 70° C. and 10 grams of phenol were added, followed by 1 ml. of boron fluoride etherate (47% $BF_3$; 1.14 weight percent $BF_3$ based on cellulose triacetate). The solution was maintained at 70° C. with agitation for two hours, while the viscosity decreased to give an almost water thin solution, then cooled to room temperature, whereupon the catalyst was neutralized by the addition of pyridine. The product was precipitated from low boiling petroleum ether, washed with methanol and water, and vacuum dried at 60° C. The white powder analyzed as follows:

| | |
|---|---|
| Acetyl value | 61.4 |
| Hydroxyl content wt. percent | 0.76 |
| Inherent viscosity dl./gm. | 0.15 |

Upon infra-red analysis the sample exhibited a maximum at 13.1 microns indicative of 2.8 percent of phenolate groups.

The following examples illustrate the provision of terminal carboxy groups to the depolymerized cellulosics.

Example XXXI 80 grams of cellulose triacetate (containing 2.7% moisture and having an acetyl value of 62.5% HOAc and an inherent viscosity of 1.74 dl./g.) was dissolved in 800 ml. methylene chloride at room temperature. 40 grams of succinic anhydride was dissolved in 200 mls. of dioxane by warming on a steam bath. This solution was added to the clear cellulose triacetate solution; followed by 2 mls. 72% perchloric acid catalyst. The total weight of water (from the cellulose triacetate and from the catalyst solution) amounted to 3.1 grams which can convert 17.2 grams of succinic anhydride to the corresponding acid. Therefore, the ratio of anhydride to acid at the start of the depolymerization was considered to be about 4 to 3.

The solution was warmed with agitation to about 40° C. for 1 hour and then cooled to room temperature (26° C.). Agitation was continued at room temperature for 20 hours. During this time the solution became brown in color but clear. On adding 5 ml. pyridine to neutralize the solution, the color was reduced to amber.

The thin solution was filtered and then added to petroleum ether to precipitate the product. The product was successively washed with petroleum ether, methanol, water, methanol and finally a mixture of methanol and petroleum ether. It was dried at 60° C. in a vacuum oven. There was obtained 63.5 grams of an off-white powdery solid which analyzed as follows:

| | |
|---|---|
| Total saponification value, percent HOAc | 67.0 |
| Rast molecular weight | 2210 |
| I.V., dl./g. | 0.16 |

The depolymerized cellulose triacetate was soluble in methylene chloride giving a crystal clear solution. It also dissolved in dioxane giving a clear solution, however, on close examination of the solutions there were present some transparent small particles. In acetone the solution was slightly cloudy and appeared to contain more insoluble particles than the dioxane solution.

The melting point behavior using a melting point block was as follows:

At about 215° C. the sample became transparent when applying slight hand pressure to the sample. At 230° C. it melted to a light yellow liquid. On raising the temperature still higher (240° C.) the melted sample became more discolored turning light brown.

Example XXXII

The same as Example XXXI, except that the solution was not warmed. The depolymerization was carried out at 24° C. for 20 hours. The solution turned brown during the depolymerization and again became amber colored on neutralization of the catalyst. After working up in a manner similar to that described in Example XXXI there was obtained 67.0 grams of an off-white solid which had the following analyses:

| | |
|---|---|
| Total saponification value, percent HOAc | 67.4 |
| Hydroxyl content, percent | <0.1 |
| I.V., dl./g. | 0.16 |

Example XXXIII 40 grams of cellulose triacetate (containing 2.7% moisture and having an acetyl value of 62.5% HOAc and an inherent viscosity of 1.74 dl./g.) was dissolved in 300 grams of s-tetrachloroethane with heat and agitation. When the temperature reached 115° C., 80 grams of succinic anhydride were added. The temperature dropped to 88° C. In 15 minutes the temperature reached 120° C. at which time 2 mls. water and 0.5 ml. concentrated sulfuric acid were added. Depolymerization was rapid at 120° C. After 5 minutes had elapsed on adding the catalyst, the latter was neutralized by adding 1.54 grams of magnesium carbonate.

The solution (brown in color) was cooled and filtered. The product was precipitated as tacky syrup by adding the filtrate to petroleum ether. The syrup was isolated by decanting and was found to solidify on adding methanol. The solidified product was washed thoroughly with methanol which removed most the color. It was finally washed with water and dried at 60° C. in a vacuum oven. There resulted 33.8 grams of a cream-colored powdery solid which had the following analyses:

| | |
|---|---|
| Total saponification value, percent HOAc | 69.9 |
| I.V., dl./g. | 0.13 |

Example XXXIV 40 grams of the cellulose triacetate described in the previous examples was dissolved in 200 ml. s-tetrachloroethane with heat and agitation. When the temperature reached 75° C. 40 grams of the succinic anhydride and 40 grams of succinic acid were added. After 5 minutes 1 gram of p-toluene sulfonic acid monohydrate was added and the temperature raised to 110° C. The solution was maintained at 110° C. for 2½ hours with agitation.

The solution was cooled and filtered. The product was precipitated in petroleum ether and worked up in a manner similar to that described in Example XXXIII. A weight of 32.8 grams of a light tan colored product was obtained. The product had the following analyses:

| | |
|---|---|
| Total saponification value, percent HOAc | 64.4 |
| Hydroxy content, percent | 0.10 |
| I.V., dl./g. | 0.28 |

Example XXV

The procedure of Example XXXIV was repeated except that the reaction time was extended. The total reaction time at 110° C. was 6½ hours. After isolating and washing the product similar to the procedures described under Example XXXIII, there was obtained a tan, powdery product weighing 30.9 grams. It had the following analyses:

| | |
|---|---|
| Total saponification value, percent HOAv | 69.3 |
| Hydroxyl content, percent | 0.32 |
| I.V., dl./g. | 0.12 |

It is to be understood that the foregoing detailed description is given merely by way of illustration and that many variations may be made therein without departing from the spirit of my invention.

The embodiments of the invention in which an exclusive property or privilege is claimed are defined as follows:

1. A process for preparing copolymers which comprises depolymerizing a high molecular weight polyanhydroglucose triester while maintaining the ester groups thereof substantially intact to form a low molecular weight polyanhydroglucose triester by contacting said high molecular weight triester in a solvent therefor with an acid catalyst, recovering the low molecular weight triester, reacting the low molecular weight triester with an organic diisocyanate and a polymer having terminal functional groups possessing active hydrogen, and recovering copolymers of low molecular weight polyanhydroglucose triester.

2. The process of claim 1 wherein said polymer having terminal functional groups possessing active hydrogen is selected from the group consisting of low molecular weight polyesters and low molecular weight polyethers, said polyesters and polyethers having an average molecular weight of from about 250 to about 5000 and melting below about 60° C.

3. A process for depolymerizing a high molecular weight polyanhydroglucose triester while maintaining the ester groups thereof substantially intact which comprises contacting a solution of the high molecular weight polyanhydroglucose triester with an acid catalyst and recovering depolymerized low molecular weight polyanhydroglucose triester.

4. The process of claim 3 wherein said reaction system also comprises a bifunctional compound having substituent groups with active hydrogen atoms, selected from the group consisting of water, aliphatic glycols, mercaptans, hydroxyaromatics, and dibasic acid/anhydrides.

5. The process of claim 3 wherein said polyanhydroglucose triester is cellulose triacetate.

6. The process of claim 5 wherein the high molecular weight cellulose triacetate has an acetyl value of at least 59 percent.

7. The process of claim 5 wherein the catalyst is selected from the group consisting of sulphuric acid, perchloric acid and boron trifluoride.

8. The process of claim 5 wherein the solvent is a chlorinated hydrocarbon and the catalyst is boron trifluoride.

9. The process of claim 5 wherein the solvent comprises a mixture of from about 98.5 percent to about 99.5 percent by weight acetic acid and from about 0.5 percent to about 1.5 percent by weight water, the catalyst is sulfuric acid and the contacting is conducted at a temperature of from about 50° C. to about 110° C.

10. The process of claim 5 wherein the solvent comprises a mixture of from about 98.8 percent to about 99.5 percent by weight acetic acid and from about 0.5 percent to about 1.2 percent by weight water, the catalyst is perchloric acid, and the contacting is conducted at a temperature of from about 50° C. to about 80° C.

11. The process of claim 5 wherein the contacting is conducted under substantially anhydrous conditions.

12. The process of claim 5 which further includes neutralizing the boron trifluoride catalyst after contacting the high molecular weight cellulose triacetate with a catalyst and before recovering the depolymerized cellulose triacetate.

13. A process for depolymerizing high molecular weight cellulose triacetate while maintaining the acetyl groups thereof substantially intact which comprises contacting a solution containing from about 10 to about 15% by weight based on the total weight of the solution of high molecular weight cellulose triacetate, said cellulose triacetate having an acetyl value of from about 61.5% to about 62.5% and an inherent viscosity of from about 1.5 to about 2.0 deciliters per gram in a solvent selected from the group consisting of methylene chloride and ethylene chloride with a boron trifluoride etherate complex catalyst containing from about 0.1 to about 10% by weight boron trifluoride, based on the weight of high molecular weight cellulose triacetate present, under substantially anhydrous conditions and at a temperature of from about 0° C. to about 150° C. and recovering the depolymerized cellulose triacetate.

14. A process for depolymerizing high molecular weight cellulose triacetate while maintaining the acetyl groups thereof substantially intact which comprises contacting a solution containing from about 10% to about 15% by weight based on the total weight of the solution of high molecular cellulose triacetate, said cellulose triacetate having an acetyl value of from about 61.5% to about 62.5% and an inherent viscosity of from about 1.5 to about 2.0 deciliters per gram in a solvent mixture comprising from about 98.5% to about 99.5% by weight acetic acid and from about 0.5% to about 1.5% by weight water with a catalyst of sulfuric acid, the catalyst being present in an amount of from about 1% to about 20% by weight based on the weight of high molecular weight cellulose triacetate, at a temperature of from about 50° C. to about 110° C., neutralizing the catalyst, further reacting the solution with water, and recovering the depolymerized cellulose triacetate.

15. A process for preparing copolymers which comprises reacting a low molecular weight polyanhydroglucose triester with a polymer having terminal functional groups possessing active hydrogen.

16. The process of claim 15 wherein said low molecular weight triester is cellulose triacetate.

17. A process for preparing copolymers which comprises reacting a low molecular weight polyanhydroglucose triester, a polymer having terminal functional groups possessing active hydrogen and an organic diisocyanate.

18. The process of claim 17 wherein said polyanhydroglucose triester is cellulose triacetate having an average molecular weight of from about 1000 to about 5000, an inherent viscosity of from about 0.05 to about 0.4 deciliter per gram and an acetyl value of at least about 60 percent.

19. A process for preparing block copolymers which comprises reacting a low molecular weight cellulose triacetate, a polymer having terminal functional groups possessing active hydrogen and being selected from the group consisting of low molecular weight polyesters and low molecular weight polyethers, said polyesters and polyethers having an average molecular weight of from about 250 to about 5000 and melting below about 60° C., and an organic diisocyanate.

20. A process for preparing block copolymers which comprises, first, reacting an organic diisocyanate with a material selected from the group consisting of low molecular weight polyesters and low molecular weight polyethers having terminal functional groups possessing active hydrogen, an average molecular weight of from about 250 to about 5000 and melting below about 60° C. in a lower alkylene halide medium to produce polymer blocks having residual isocyanate groups, and, second, reacting the polymer blocks with low molecular weight cellulose triacetate to produce a linear, segmented elastomeric copolymer.

21. A copolymer comprising a low molecular weight polyanhydroglucose triester and a polymer having terminal functional groups possessing active hydrogen.

22. A block copolymer comprising soft and hard segments, said hard segments comprising cellulose triacetate having an average molecular weight of from about 1000 to about 5000, an inherent viscosity of from about 0.05 to about 0.4 dl./g., and an acetyl value of at least about 60 percent, and said soft segment being represented by a formula selected from the group consisting of

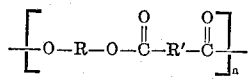

and

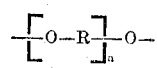

wherein R and R′ are organic divalent radicals containing terminal functional groups possessing active hydrogen and *n* is such that the molecular weight ranges from about 250 to about 5000.

23. Depolymerized cellulose triacetate having an average molecular weight of from about 1000 to about 5000, an inherent viscosity of from about 0.05 to about 0.4 deciliter per gram, and an acetyl value of at least about 60 percent.

No references cited.

WILLIAM H. SHORT, *Primary Examiner.*

J. NORRIS, *Assistant Examiner.*